United States Patent
Cohen et al.

(10) Patent No.: US 11,069,356 B2
(45) Date of Patent: Jul. 20, 2021

(54) COMPUTER SYSTEM AND METHOD FOR CONTROLLING USER-MACHINE DIALOGUES

(71) Applicant: ABB Schweiz AG, Baden (CH)

(72) Inventors: Andrew Cohen, Ludwigshafen am Rhein (DE); Benedikt Schmidt, Heidelberg (DE); Benjamin Kloepper, Mannheim (DE); Marco Gaertler, Dossenheim (DE); Arzam Kotriwala, Ladenburg (DE); Marcel Dix, Mannheim (DE); Sylvia Maczey, Hirschberg (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/988,732

(22) Filed: Aug. 10, 2020

(65) Prior Publication Data
US 2021/0166684 A1 Jun. 3, 2021

Related U.S. Application Data

(63) Continuation of application No. PCT/EP2019/052798, filed on Feb. 5, 2019.

(30) Foreign Application Priority Data
Feb. 16, 2018 (EP) ..................... 18157237

(51) Int. Cl.
*G10L 15/22* (2006.01)
*G10L 15/30* (2013.01)
*G05B 19/042* (2006.01)

(52) U.S. Cl.
CPC ............ *G10L 15/22* (2013.01); *G05B 19/042* (2013.01); *G10L 15/30* (2013.01); *G10L 2015/223* (2013.01); *G10L 2015/228* (2013.01)

(58) Field of Classification Search
CPC ... G10L 15/22–2015/228; G10L 15/30; G05B 19/042
(Continued)

(56) References Cited

U.S. PATENT DOCUMENTS

| | | | | |
|---|---|---|---|---|
| 6,044,347 A | * | 3/2000 | Abella | G10L 15/18 704/272 |
| 6,246,981 B1 | * | 6/2001 | Papineni | G10L 15/22 704/235 |

(Continued)

OTHER PUBLICATIONS

Ntuen C A et al: "Command Language For Supervisory Control Of Mining Teleoperation", Jul. 27, 1994; Jul. 27, 1994-Jul. 29, 1994, Jul. 27, 1994 (Jul. 27, 1994), pp. 58-65.

*Primary Examiner* — Abul K Azad
(74) *Attorney, Agent, or Firm* — Leydig, Voit & Mayer, Ltd.

(57) ABSTRACT

A computer system for controlling a dialogue between a user and the computer system, the computer system being communicatively coupled with an industrial control system controlling an industrial system, the computer system including: an interface for receiving intent inputs representing a respective desired interaction with the computer system; an intent determination module for determining the desired interactions of received intent inputs; a data storage for storing one or more directed graphs, each graph specifying an industrial control domain specific dialogue, a particular graph defining a dialogue state machine with a plurality of nodes representing states of the dialogue, and with edges representing transitions between the states, each state transition from a first state to a second state depending on at least one precondition, the desired interaction of a received intent input corresponding to a target node to be reached from a current node of the particular graph.

15 Claims, 14 Drawing Sheets

(58) Field of Classification Search
USPC .......................................................... 704/275
See application file for complete search history.

(56) References Cited

U.S. PATENT DOCUMENTS

| | | | |
|---|---|---|---|
| 6,356,869 B1 | 3/2002 | Chapados et al. | |
| 6,510,411 B1* | 1/2003 | Norton | H04M 3/4936 |
| | | | 379/76 |
| 7,024,368 B1* | 4/2006 | Matheson | G10L 15/22 |
| | | | 704/257 |
| 8,812,323 B2* | 8/2014 | Tong | G06F 40/35 |
| | | | 704/257 |
| 2010/0299136 A1 | 11/2010 | Tong et al. | |
| 2016/0171387 A1* | 6/2016 | Suskind | G10L 13/08 |
| | | | 706/12 |
| 2017/0329466 A1 | 11/2017 | Krenkler et al. | |
| 2017/0329630 A1 | 11/2017 | Jann et al. | |
| 2017/0360359 A1 | 12/2017 | Dugan | |
| 2019/0237068 A1* | 8/2019 | Canim | G06F 16/288 |

* cited by examiner

COMPUTER SYSTEM AND METHOD FOR CONTROLLING USER-MACHINE DIALOGUES

CROSS-REFERENCE TO PRIOR APPLICATION

This application is a continuation of International Patent Application No. PCT/EP2019/052798, filed on Feb. 5, 2019, which claims priority to European Patent Application No. EP 18157237.1, filed on Feb. 16, 2018. The entire disclosure of both applications is hereby incorporated by reference herein.

FIELD

The present invention generally relates to human-machine interaction, and in particular relates to methods, computer program products and systems for controlling a dialogue between a user and a computer system being communicatively coupled with an industrial control system.

BACKGROUND

Devices of industrial systems (e.g., production plants, smart buildings, ventilation systems, etc.) are typically monitored and process controlled by automation systems. For example, process plant devices typically provide tens of thousands of signals which are relevant for monitoring the technical state and/or for process control of the plant. Some devices provide data in a digital format which are of interest to operators (users) of the automation system. Data may also be relevant to particular computer system functions for further processing. The devices are typically connected via appropriate network technology (e.g., the Internet of Things (IoT), Programmable logic controllers (PLCs), distributed control systems (DCSs)).

Typically, such industrial systems are controlled and monitored by an industrial control system. The monitoring function may also be implemented outside the industrial control system. Human operators can operate the industrial system via user interfaces provided by the industrial control system. However, the control tasks can have a high degree of complexity requiring numerous interaction steps with the industrial control system to perform complex analytic steps for analyzing the technical state of industrial system. It is a challenge to support human users in their technical task to control the industrial system allowing for an intuitive way of interacting with the control system and bringing only important information to a user. Some existing solutions in self-help and self-service applications or consumer support systems are mainly build on so-called waterfalls. A waterfall is a specific implementation of a dialogue that is most commonly used to collect information from the user or guide the user through a series of tasks. The tasks are implemented as an array of functions where the results of the first function are passed as input into the next function, and so on. Each function typically represents one step in the overall process. At each step, a chatbot prompts the user for input, waits for a response, and then passes the result to the next step. Such waterfalls show a basically linear behavior with some forking in the predefined dialogue structure allowed. However, existing dialogue systems are quite static in that the dialogue follows a rigid workflow like dialogue structure which does not allow for flexible interaction of the user with the system in cases where unexpected situations arise (e.g., an anomaly in the behavior of the industrial system). This makes waterfall based systems less useful for the complex interactions occurring between users and industrial control systems.

SUMMARY

In an embodiment, the present invention provides a computer system for controlling a dialogue between a user and the computer system, the computer system being communicatively coupled with an industrial control system controlling an industrial system, the computer system comprising: an interface configured to receive intent inputs representing a respective desired interaction with the computer system; an intent determination module configured to determine the desired interactions of received intent inputs; a data storage configured to store one or more directed graphs, each graph specifying an industrial control domain specific dialogue, a particular graph defining a dialogue state machine with a plurality of nodes representing states of the dialogue, and with edges representing transitions between the states, each state transition from a first state to a second state depending on at least one precondition, the desired interaction of a received intent input corresponding to a target node to be reached from a current node of the particular graph; a context cache configured to store parameter values for parameters of the at least one precondition; and a dialogue controller module configured to: check if all parameter values required by the at least one precondition for transitioning from the current node to the target node are available in the received intent input or in the context cache, if at least one required parameter value is missing, then generate a temporary dialogue node to request the at least one missing parameter and store the requested parameter in the context cache upon receipt, else trigger an interaction associated with the target node to retrieve data about a technical state of the industrial control system as a response to the desired interaction associated with the target node, wherein the interface is configured to provide dialogue rendering information for presenting to the user cognitive information associated with the nodes which are processed by the dialogue controller module.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

Figure 1:
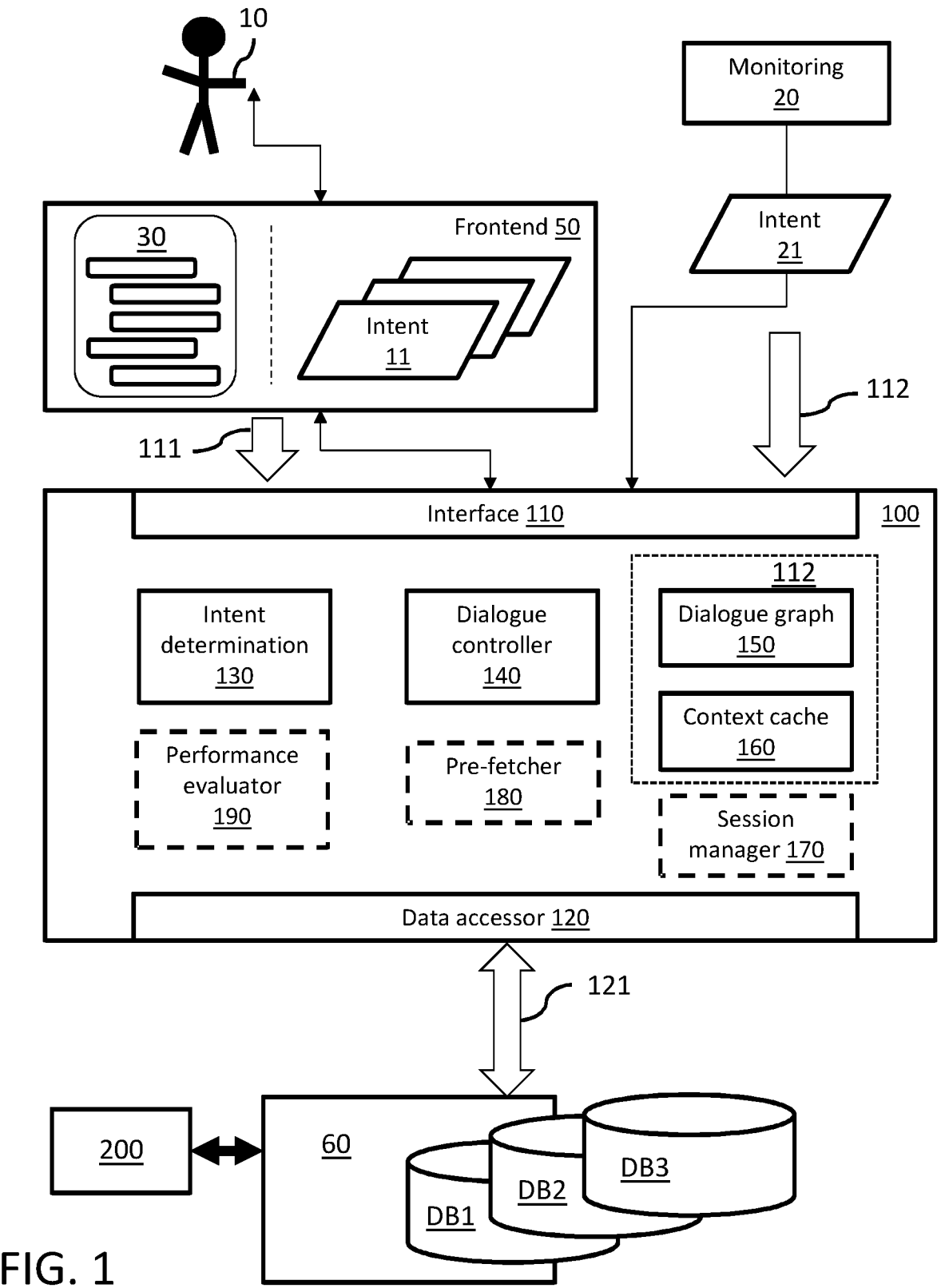
FIG. 1 is a block diagram of a computer system for controlling a dialogue between a user and the computer system with peripheral components according to an embodiment.

As used herein, the * symbol in combination with a figure number stands for any of the A, B etc.

DETAILED DESCRIPTION

There is therefore a need to improve the control of a dialogue between a human user and a machine (computer system) to allow more flexibility which is needed in an industrial system control environment with a huge potential for unexpected operating situations of the industrial system requiring the attention of human operators. Further, there is a need to improve the control of system guided dialogues with regards to the fault tolerance against user errors. Technical systems need to be intrinsically tolerant against non-specified user-interaction/operation. Therefore, they are usually adapted to a number of pre-defined user-interactions. However, in situations with non-defined user-interactions, the system needs to assume a state that is at least save for the user or that prevents damage to the system. If a user is under stress or is less experienced, wrong decisions regarding the control of the industrial system may occur which cause severe damage to the industrial system (e.g., causing down times because of broken system components).

These technical problems are solved by a computer system, computer-implemented methods and corresponding computer program product for controlling a dialogue between a user and the computer system by the features described herein. The computer system is communicatively coupled with an industrial control system which controls an industrial system. Further, the computer system may be coupled with one or more database systems storing technical state information about the industrial system wherein the stored information is derived from raw data or pre-processed data of the industrial system by appropriate algorithms.

The computer system has an interface to receive intent inputs. An intent input represents a respective desired interaction with the computer system. In one embodiment, the interface continuously listens to a user intent channel and to a monitoring intent channel. The user intent channel provides natural language intents from the user (e.g., spoken or written messages) and the monitoring intent channel provides machine generated intents from a monitoring system for the industrial system. For example, the user intents can be captured via a frontend of the computer system (e.g. a client device with respective user interaction means, such as microphone or keyboard, touchscreen, etc., supporting input/output interaction with the user). The monitoring intents can be directly received via a machine-to-machine interface between the computer system and the monitoring system. The monitoring system can be an integral part of the industrial control system. It may further include additional monitoring components or it may be an independent system which is fed by operational data of the industrial system (e.g., sensor data reflecting the technical status of industrial system components).

The computer system further has an intent determination module to determine the desired interactions of received intent inputs. Especially with regards to the received user intents which are typically received as natural language statements of the user the intent determination module can determine the meaning behind the received intent inputs and map the received inputs to standardized terms which can be further processed by the computer system. It is to be noted that even for intent inputs of the monitoring system the intent determination module may be relevant in such cases where the monitoring system has a speech or display function providing natural language statements to the user. However, typically the monitoring system intents are provided in the form of structured data which is already understandable by the computer system for further processing.

Intent determination modules are commercially available. An example is the Language Understanding Intelligent Service (LUIS) offered by Microsoft, Redmond, Wash., USA. Cognitive Services LUIS exposes cloud-based APIs that enable applications to easily integrate recognition capabilities for input such as speech. The Bing Speech APIs are accessible through a REST endpoint and a variety of client libraries. A benefit of these client libraries is that they allow for recognition results as the microphone data is streamed to Cognitive Services. A person skilled in the art may use LUIS or similar tools to implement the intent determination module accordingly.

A data storage of the computer system stores one or more directed dialogue graphs. Any appropriate storage means for storing data may be used. Each dialogue graph specifies an industrial control domain specific dialogue, that is, a dialogue which models an interaction of a user with the computer system to handle a situation which is associated with the operating and controlling of industrial systems. A particular dialogue graph defines a dialogue state machine with a plurality of nodes representing states of the dialogue, and with edges representing transitions between the states. The dialogue state machine includes the rules according to which a dialogue is executed. The nodes of the dialogue represent content items of the dialogue and the edges represent the allowed order in which such content items can occur once the dialogue is instantiated based on the respective dialogue graph. Each state transition from a first state to a second state depends on at least one precondition. Only when the at least one precondition is fulfilled the corresponding transition is allowed. The preconditions may be stored with the respective target nodes to be reached or they can be stored with the respective transitions. The desired interaction of a received intent input corresponds to a target node to be reached from a current node of the particular graph. For example, at the beginning of a dialogue a predefined initialization node (e.g., a start node) can be considered to be the current node. In another embodiment, when a dialogue starts the target node itself can be considered as the current node wherein the node performs a transition to itself (self-loop). In many situations the target node which is mapped to the received intent input may not be directly reachable from the current node. For example, there can be further nodes to be passed on the path from the current node to the target node. In this case, the target node is stored or buffered as a queued node in a context cache explained in the following.

Preconditions require parameter values. The computer system has a context cache for storing such parameter values. For example, a precondition may be that a particular time information is required for a transition from the current node to the target node. Such time information parameter may be received with the intent input or it may already be present in the context cache from previous interactions. The context cache stores all parameter values which are collected while a particular instance of the dialogue graph is running. In other words, the parameter values stored in the context cache define the context in which the dialogue is executed. This also includes context parameter values which are retrieved via queries to technical state databases or the industrial control system itself as explained further down.

The computer system further has a dialogue controller module. The dialogue controller is the module which executes a particular dialogue state machine represented by a corresponding dialogue graph. In other words, the dialogue controller enables the transition from the current node to the target node to enable the desired interaction represented by the received intent. If the target node is not directly reachable from the current node, the dialogue controller determines a dialogue path to the target node. The target node is remembered in the context as a queued node. The dialogue controller can then proceed with the first node on the determined dialogue path as an intermediate target node which may then be followed by further intermediate target nodes on the determined dialogue path until the original target node is finally reached. The following description describes the situation that the target node can be directly reached from the current node. However, the same mechanisms apply to intermediate target nodes. That is, any target node which is only reachable from the current node via a dialogue path including further nodes of the dialogue graph can be reached by applying the mechanisms disclosed in the following with regards to the target node in the same manner also to the intermediate target nodes while storing each subsequent intermediate node as a queued node for the preceding node in the context. In other words, the queued node information in the context allows a stepwise processing of any number of intermediate (target) nodes to finally reach the target node mapped to the initial intent input. The context can store queued nodes in a stack where the target node is at the bottom of the stack. If an intermediate target node is determined it can be added on top of the stack. If the intermediate target node is then reached through a valid transition the respective queued node is removed again from the stack.

The dialogue controller checks if all parameter values required by the at least one precondition for transitioning from the current node to the target node are available in the received intent input or in the context cache. If at least one required parameter value is missing, the dialogue controller generates a temporary dialogue node to request the at least one missing parameter. The requested parameter is then stored in the context cache upon receipt. The generation of temporary dialogue nodes allows to keep the dialogue graphs to a minimum size (in terms of number of dialogue nodes) and create context specific dialogue nodes on the fly based on the matching of the available dialogue context and the context required by the respective preconditions. The context of the dialogue can thereby be gradually developed by generating such temporary nodes only when needed. As a consequence, there is no need to foresee such nodes as permanent nodes in the dialogue graph as it is typically the case in prior art dialogue control systems. This allows two keep predefined dialogue graphs at a minimum size which helps to save memory of the data storage, especially when a large number of dialogues is stored for many different dialogue scenarios of multiple users performing multiple roles. Further, the smaller the number of nodes, the easier is the maintenance of the dialogue control graphs.

If there are no missing parameters for the at least one precondition being fulfilled (i.e., there can be multiple preconditions for a single state transition), that is, if the required context is already known by the computer system, the dialogue controller triggers an interaction associated with the target node to retrieve data about the technical state of the industrial system as a response to the desired interaction associated with the target node. In the domain of industrial system control, typical desired interactions are the review of recent alarms, review of signal trends, detection of system anomalies, etc. More examples are discussed in the detailed description.

Finally, the interface provides dialogue rendering information for presenting to the user cognitive information associated with the nodes which are processed by the dialogue controller. This cognitive information includes one or more visual indicators for the user reflecting the technical state of the industrial system as reflected by the retrieved data. The data retrieval can be directed to the industrial control system itself or to other database systems storing such technical status data reflecting the state of the industrial system. The cognitive information is then presented to the user/operator to enable the user to trigger a corrective action if needed. The final rendering into visible and/or audible dialogue components can occur at the front end of the computer system which serves as the user interface for the operator(s). That is, the output to the user includes the response from the computer system to the user's intent input. The output to the user may include visualizations of the various dialogue steps together with retrieved technical status data. In addition or alternatively, the frontend may generate a voice output reading out reading out system responses to the user's intent inputs.

Optionally, the computer system can interact with multiple users/operators and/or with multiple user roles. In one embodiment, the computer system further has a session manager module to manage a separate dialogue session for each user wherein the separate dialogue session uses a dialogue graph which is associated with one or more roles of the respective user. Typically, complex industrial systems require multiple operators to control the industrial system via the industrial control system. In general, different operators can have different skill sets and normally perform different, specialized roles. Different roles typically involve different control dialogues with the computer system. Therefore, the data storage can store role specific dialogue graphs which can then automatically be instantiated when a user who is assigned to the respective role logs on to the computer system. As multiple operators may be logged in simultaneously, the dialogue controller can instantiate multiple dialogue state machines corresponding to different dialogues in parallel in separate sessions. Such sessions are handled by the session manager. Session handling is well known in the art and needs no further explanation for a skilled person.

In one embodiment, a user (e.g., a power user) may be assigned to multiple roles. For example, a first role of the user is associated with a first dialogue graph and a second role of the user is associated with a second dialogue graph.

The dialogue controller can enable transitions between the nodes of the first graph and nodes of the second graph. For example, particular nodes may be flagged as interface nodes for nodes of other dialogue graphs. The dialogue controller can identify such interface nodes and generate respective transitions between such interface nodes.

The dialogue graphs can be designed in a very flexible manner, which is quite different from the relatively inflexible, workflow type of graphs in the so called waterfall models. For example, a particular dialogue graph may include at least one node which can be directly reached from all other nodes of the dialogue graph by respective transitions. Such a node can for example implement a help interaction. As a consequence, whenever a user gets lost with the current interaction, the user can always—at any time—transition to the help node to learn about how to get out of the stuck situation. This enhanced fault tolerance of the computer system increases the fault tolerance of the dialogue control against any mal-operation by the user.

Further, a particular node may represent the first state of the dialogue and, at the same time, the second state. That is, the respective state transition occurs as a self-loop for the particular node. This allows to reuse the same node (e.g., desired interaction: show data) again and again with different parameters to show different sets of data to the user. In other words, a state can include different sub-states that are differentiated by different parameters wherein however the sub-states need not to be represented by separate dialogue nodes of the dialogue graph. Again, this feature allows to keep the size of the respective dialogue graph to a minimum and facilitates maintenance of the graph enormously because it is irrelevant which type of data is retrieved and shown. The node can always transition back to itself as long as the intent is to show any data.

Further, the dialogue graph also allows circular loops among the nodes. For example, a particular node can reach itself via a circular path passing one or more other nodes of the graph. This helps to avoid the definition of repeating sub-structures in the graph when similar sequences of desired interactions are to be repeated. Again, for similar reasons as above, this feature allows to keep the size of the respective dialogue graph to a minimum and facilitates maintenance of the graph.

In one embodiment, in addition to providing rendering information with the already retrieved technical data, the computer system can further offer recommendations to the user. In a first recommendation embodiment, the computer system further has a pre-fetch module to check if multiple nodes of the graph are reachable from the target node. If this is the case there may be different options for the user to further explore the technical state of the industrial system. The pre-fetch module identifies potential desired interactions associated with those reachable nodes. If the current context allows to retrieve further technical state data of the industrial system related to the identified desired interactions of the further reachable nodes the pre-fetch module can trigger the retrieval of such data. Such additional data for reachable desired interaction nodes can then be provided to the user as recommendations (i.e., options for further technical state exploration). For this purpose, the dialogue controller can assemble the additionally retrieved technical state data together with the dialogue rendering information for the target node as a recommendation to the user for further exploring the technical state of the industrial system. Again, the entire information can then be rendered by the frontend device of the user/operator.

In a further recommendation embodiment, which can be combined with the previously disclosed recommendation approach, the data storage stores, in addition to the dialogue graphs, one or more predefined data graphs. A particular data graph represents relations between data types of data related to the industrial system. Each node of the data graph corresponds to a particular data type, and each edge of the data graph has a precondition specifying an allowed query parameter for a particular query to retrieve respective data about the technical state of the industrial system, and has a post condition specifying a return data type of the particular query.

The dialogue controller may then identify a first data type associated with the target node of the dialogue graph which is used for the current running dialogue instance. Then, a first node representing the first data type is identified in the data graph. Then, the data graph is traversed to identify further data types having a direct or indirect relation with the first data type. In other words, the dialogue controller identifies data types which have a logical dependence on the first data type. Finally, the identified further data types are assembled together with the dialogue rendering information for the target node as a recommendation to the user for potential queries to retrieve respective data about the technical state of the industrial system. The idea behind this recommendation approach is to offer to the user/operator information about other data types which have a dependency of the currently queried data type because there may be complementary hidden information about the explored technical state in the respective technical data.

In one embodiment, the dialogue controller can be adaptive to the physical/mental condition of the user/operator. For example, users may suffer from different stress levels which may be related to the health condition of the user and/or the experience and skills of the user. There are a commercially available systems which can derive the performance level of the user based on measured physical parameters characterizing the current physical/mental condition of the user. The computer system integrates such a system in a performance evaluator module. Further, a particular dialogue graph includes alternative dialogue paths for a particular desired interaction. Each alternative path is associated with a predefined performance level of the user. For example, if the performance level indicates a high level of stress of the user, a dialogue path may be preferred which is relatively linear and short and avoids any distraction but still leads to a usable analysis result regarding the technical system state of the industrial system. The performance evaluator receives such physical parameters characterizing the current physical condition of the user and determines a current performance level for the user based on the received physical parameters. The dialogue controller can then select a particular alternative path having a predefined performance level which matches with the current performance level. In this embodiment, the dialogue controller adapts to the physical condition of the user in such a way that the probability for a correct and fast analysis is increased by offering dialogue interactions which match the user's current performance or stress level.

In one embodiment, the alternative path for the lowest performance level (e.g., the highest stress level) may be selected by using a shortest path algorithm. However, in this embodiment the shortest path is not necessarily the path with the lowest number of interaction nodes to reach a certain desired interaction node. Rather, the shortest path depends on the preconditions of the nodes to be passed and on the available context for fulfilling the preconditions. For example, a dialogue path passing three intermediate nodes where all preconditions are already fulfilled by the available context (and thus does not trigger any additional interaction of the user on the way to the target node) is "shorter" than a path with only one intermediate node having a precondition which cannot be fulfilled by the available context and therefore would trigger an additional user interaction.

In a further embodiment, computer-implemented method for controlling a dialogue between a user and the computer system is provided which may be executed by the previously disclosed computer system. The computer system is communicatively coupled with an industrial control system controlling an industrial system. The method includes: receiving an intent input wherein the intent input represents a respective desired interaction with the computer system; determining the desired interaction of the received intent input; matching the desired interaction with a target node to be reached from a current node of a directed graph specifying an industrial control domain specific dialogue, wherein the graph defines a dialogue state machine with a plurality of nodes representing states of the dialogue, and with edges representing transitions between the states, each state transition from a first state to a second state depending on at least one precondition; checking if all parameter values required by the at least one precondition for transitioning from the current node to the target node are available in the received intent input or in a context cache; if at least one required parameter value is missing, generating a temporary dialogue node to request the at least one missing parameter and storing the requested parameter in the context cache upon receipt, else triggering an interaction associated with the target node to retrieve data about the technical state of the industrial system as a response to the desired interaction associated with the target node; and providing dialogue rendering information for presenting to the user cognitive information associated with the most recent processed node.

The receiving an intent step may include continuously listening to a user intent channel and to a monitoring intent channel, the user intent channel providing natural language intents from the user and the monitoring intent channel providing machine generated intents from a monitoring system for the industrial system. In other words, at any time, the computer system can receive natural language intent inputs from a user (spoken language messages or written messages), but also machine generated intents which both may trigger the instantiation of a dialogue.

In one recommendation embodiment, the method may further include the steps: checking if multiple nodes of the graph are reachable from the target node; identifying potential desired interactions associated with the multiple nodes; retrieving technical state data related to the identified desired interactions if available; and assembling the retrieved state data together with the dialogue rendering information for the target node as a recommendation to the user for exploring the technical state of the industrial system.

In another recommendation embodiment, a predefined data graph represents relations between data types of data related to the industrial system. Each node of the data graph corresponds to a particular data type. Each edge of the data graph has a precondition specifying an allowed query parameter for a particular query to retrieve respective data about the technical state of the industrial system, and a post-condition specifying a return data type of the particular query. The method may further include: identifying a first data type associated with the target node of the dialogue graph; identifying a first node in the data graph representing the first data type; traversing the data graph to identify further data types having a direct or indirect relation with the first data type; and assembling the identified further data types together with the dialogue rendering information for the target node as a recommendation to the user for potential queries to retrieve respective data about the technical state of the industrial system.

In one embodiment, the graph includes alternative dialogue paths for a particular desired interaction, each alternative path associated with a predefined performance level of the user, and the method may further include: receiving one or more physical parameters characterizing the current physical condition of the user; determining a current performance level for the user based on the physical parameters; and selecting a particular alternative path having a predefined performance level which matches with the current performance level.

In one embodiment, a computer program product is provided for controlling a dialogue between a user and a computer system, the computer system being communicatively coupled with an industrial control system controlling an industrial system. The computer program product has instructions that when loaded into a memory of a computing device and executed by at least one processor of the computing device cause the computing device to execute the steps and functions of the computer-implemented methods and computer system as disclosed herein.

Further aspects of the invention will be realized and attained by means of the elements and combinations particularly depicted herein. It is to be understood that both, the foregoing general description and the following detailed description are exemplary and explanatory only and are not restrictive of the invention as described.

Figure 2A:
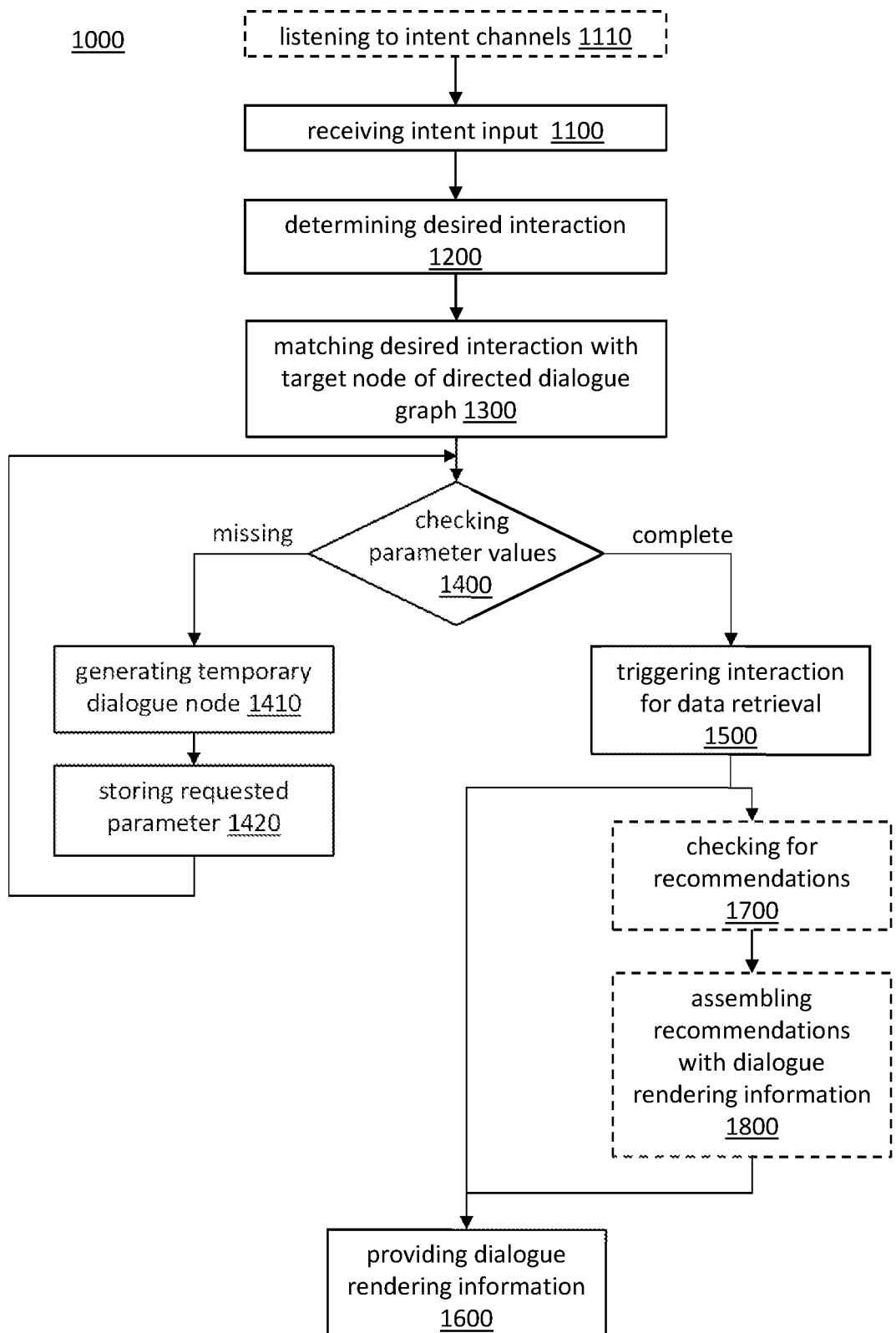
FIG. 2A is a simplified flowchart of a computer-implemented method for controlling a dialogue between a user and the computer system according to an embodiment.
Figure 2B:
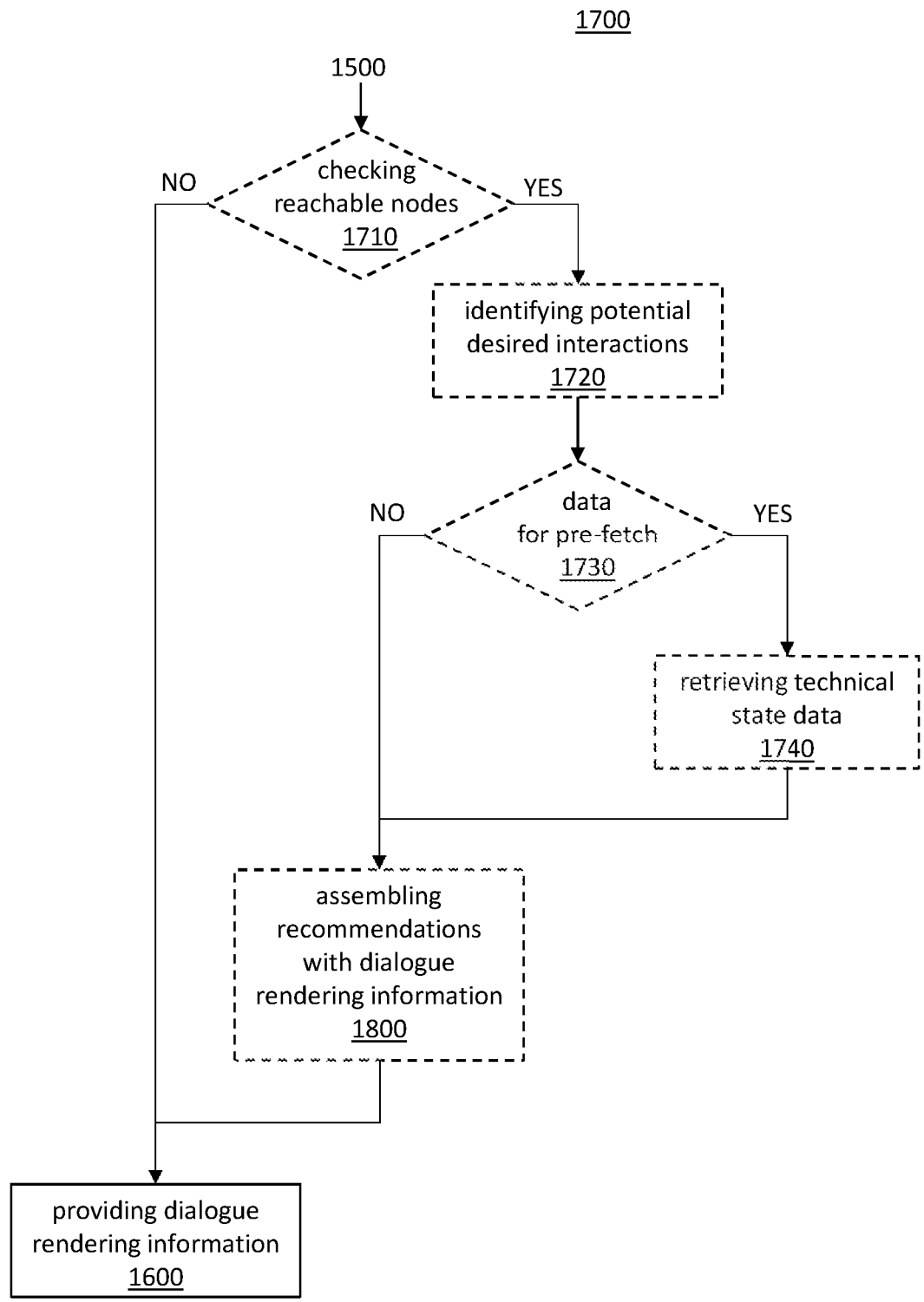
FIG. 2B is a simplified flowchart with further details of the computer-implemented method according to an embodiment.

FIG. 1 is a block diagram of a computer system 100 for controlling a dialogue between a user 10 and the computer system 100 with peripheral components according to an embodiment. FIG. 1 will be described in the context of FIGS. 2A, 2B showing simplified flow charts of a computer-implemented method 1000 which can be executed by the computer system 100. The following description therefore relates to reference numbers of FIG. 1 and FIGS. 2A, 2B. The computer system 100 is communicatively coupled with an industrial control system 60 controlling an industrial system 200. Communication protocols for the communication between industrial systems, industrial control systems and computer systems for controlling the human machine interaction with such systems are well known in the art.

An interface 110 of the computer system 100 receives 1100 intent inputs 11, 21. An intent input represents a respective desired interaction with the computer system 100. Thereby, intent inputs can originate from human users 10. Such intents are typically provided in a natural language of the user, for example as a voice input via a speech interface or in writing via a keyboard or another appropriate input device. The user 10 uses the frontend 50 which incorporates such user interface functions like receiving inputs from the user and providing outputs to the user. Outputs may be provided on a display of the frontend 50 or provided through loudspeakers as voice output. Further, intent inputs can originate from a monitoring function 20 which monitors the technical state of the industrial system 200. The monitoring function 20 may be an integral part of the industrial control system 60 or it may include one or more separate monitoring systems which can access technical status data of the industrial system 200 provided by the industrial control system 60 or by other databases DB1 to DB3 collecting such data. The databases DB1 to DB3 may already include preprocessed data of the industrial system, such as for example, an alarm history or the like. The computer system 100 observes intent inputs 11, 21 of both origins via the interface 110 continuously listening 1110 to a user intent channel 111 and to a monitoring intent channel 112. The user intent channel provides natural language intents from the user and the monitoring intent channel provides machine generated intents from a monitoring system for the industrial system. As mentioned earlier, a machine generated intent may have a structured data format (i.e., a format that allows processing by system 100) but may also be received as a natural language statement (i.e., in a format that requires pre-processing, intent determination etc.).

The intent determination module 130 determines 1200 the desired interactions of the received intent inputs 11, 21. The earlier described LUIS tool may be used for implementing this function. Examples of other available tools are: APILai API, Amazon LEX (developer guide available at https://aws.amazon.com/documentation/lex/?ncl=h_ls), Recast.ai (documentation available at https://recast.ai/docs/hello-world), wit.ai (documentation available at https://wit.ai/docs), IBM Watson Conversation (documentation available at https://www.ibm.com/watson/services/conversation/). The intent determination 130 can be configured in a way that natural language intents inputs can be transformed into a machine understandable statement representing a desired interaction as the purpose of the received intent. A skilled person can use the available tools to implement the described function.

The data storage 112 stores one or more directed dialogue graphs 150. Each dialogue graph specifies an industrial control domain specific dialogue. Such a domain specific dialogue includes a model of typical user interactions with the computer system 100 in scenarios such as alarm management, root cause analysis and other tasks which typically fall into the responsibility of an operator of the industrial control system 60. A particular dialogue graph defines a dialogue state machine with a plurality of nodes representing states of the dialogue, and with edges representing transitions between the states.

Figure 3A:
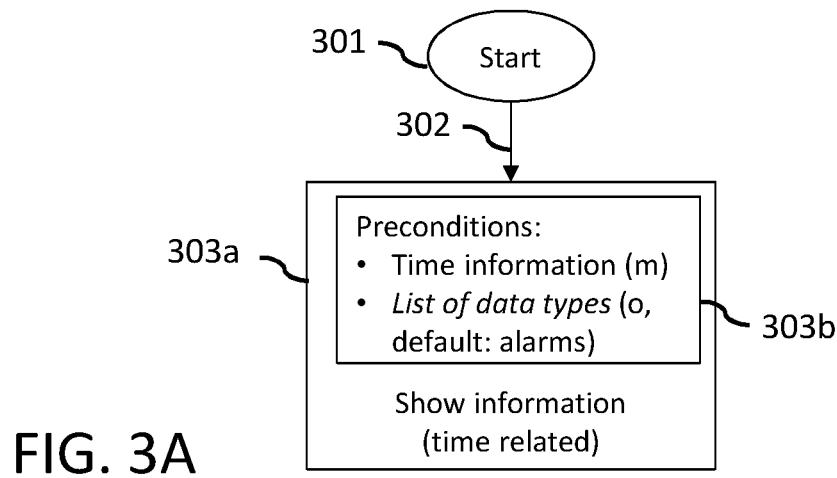
FIG. 3A illustrates a node of a directed dialogue graph.
Figure 3B:
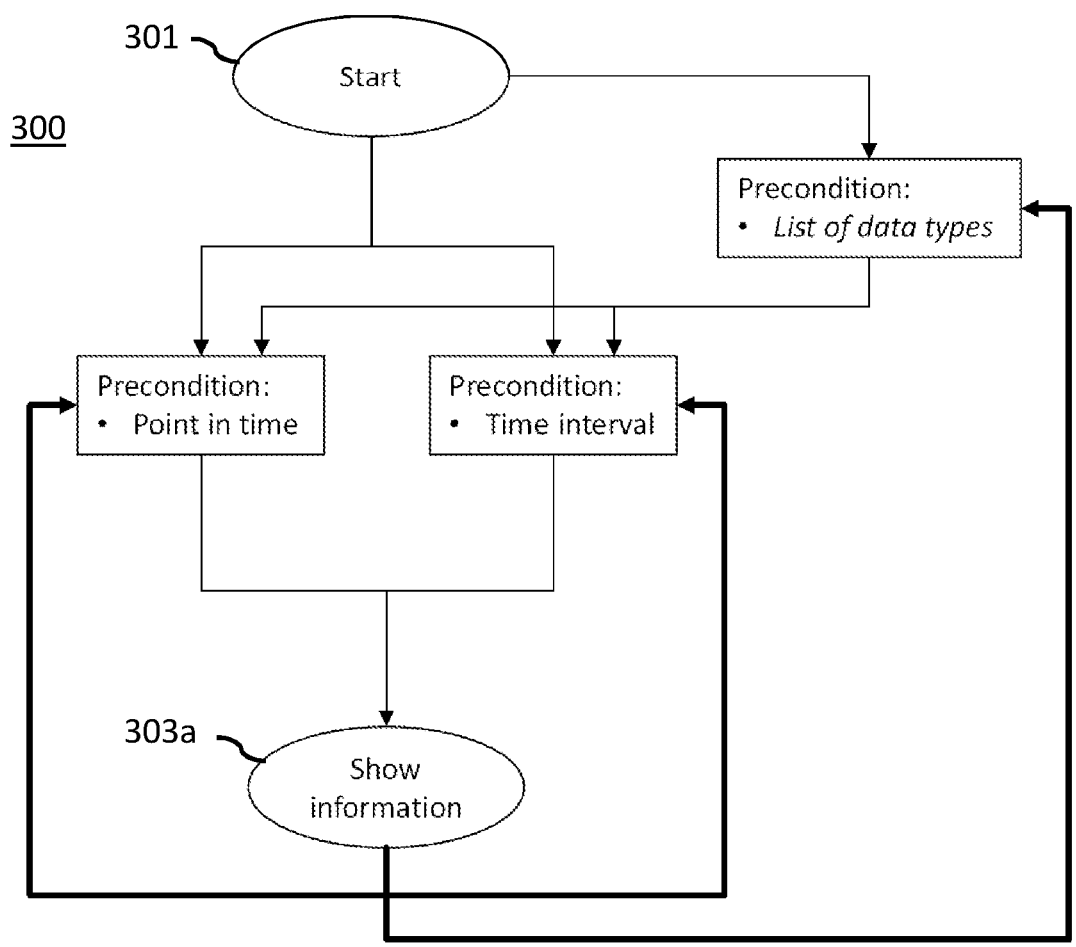
FIG. 3B illustrates the functioning of the dialogue graph as a dialogue state machine.

Turning briefly to FIGS. 3A and 3B, FIG. 3A shows an example of dialogue node "show information" 303a with a transition 302 from a start node 301. When a dialogue is instantiated from a respective dialogue graph, the start node 301 may be the initial entry point into the dialogue. However, another node of the graph may be defined as default entry point as well. In case the node 303a corresponds to the desired interaction behind the received intent input, the dialogue state machine 300 of FIG. 3B illustrates how the transition 302 from the start point 301 to the target node 303a occurs. The dialogue state machine 300 is executed by the dialogue controller module 140 once the corresponding dialogue has been instantiated from the respective dialogue graph. Each state transition from a first state 301 to a second state 303a depends on at least one precondition 303b. The precondition 303b can be implemented as part of the target node 303a (as shown in the example), or it can be associated with the transition 302. That is, the dialogue controller evaluates the preconditions to determine whether a transition 302 from a current node 301 to the target node 303a can occur. A node may have multiple preconditions as shown in the example of FIG. 3A. Some preconditions may have mandatory character (m) like the information about a particular time point or time interval. Some preconditions (in italics) may have optional character (o) like the list of data types in the preconditions 303b. Optional preconditions have a default value which is used if no other parameter value is given.

FIG. 3B shows the dialogue state machine 300 which is instantiated on the basis of the dialogue graph shown in FIG. 3A. The mandatory precondition "Time information" can be satisfied by either providing a "point in time" parameter or a "time interval" parameter. If any of such parameters is provided, the transition 301 from the start node 301 to the target node 303a occurs. The optional preconditions "list of data types" has "alarms" as default data type with the consequence that the node 303a "show information" will show alarm data by default. For example, the user may specify further data types, like for example particular signal data, in the intent input which can then also be taken into account by the interaction node 303a when showing the respective information. The bold arrows in FIG. 3B illustrate that the interaction with the node 303a may result in adding further parameters for the preconditions. For example, the user may start initially with the default parameter "alarms" in the list of data types. If a particular alarm indicates a potential problem, the user may request a drill down into the information by further specifying a data type "input current" to see more details regarding particular signals which may be associated with the viewed alarms.

Coming back to FIG. 1, the context cache 160 stores parameter values for parameters of the precondition(s). Certain parameters required to fulfill the precondition(s) may already come with the received intent inputs. Such parameters are added to the context cache of a running dialogue instance and define the context in which the dialogue is executed. When the dialogue controller 140 decides about whether a state transition to a target node (corresponding to the desired interaction specified by the received intent) can occur, it first matches 1300 the desired interaction to a node of the dialogue graph and identifies the matching node as the target node. Then, it checks 1400 if all parameter values required by the at least one precondition for transitioning from the current node to the target node are available in the received intent input 11, 21 or in the context cache 160.

Figure 5:
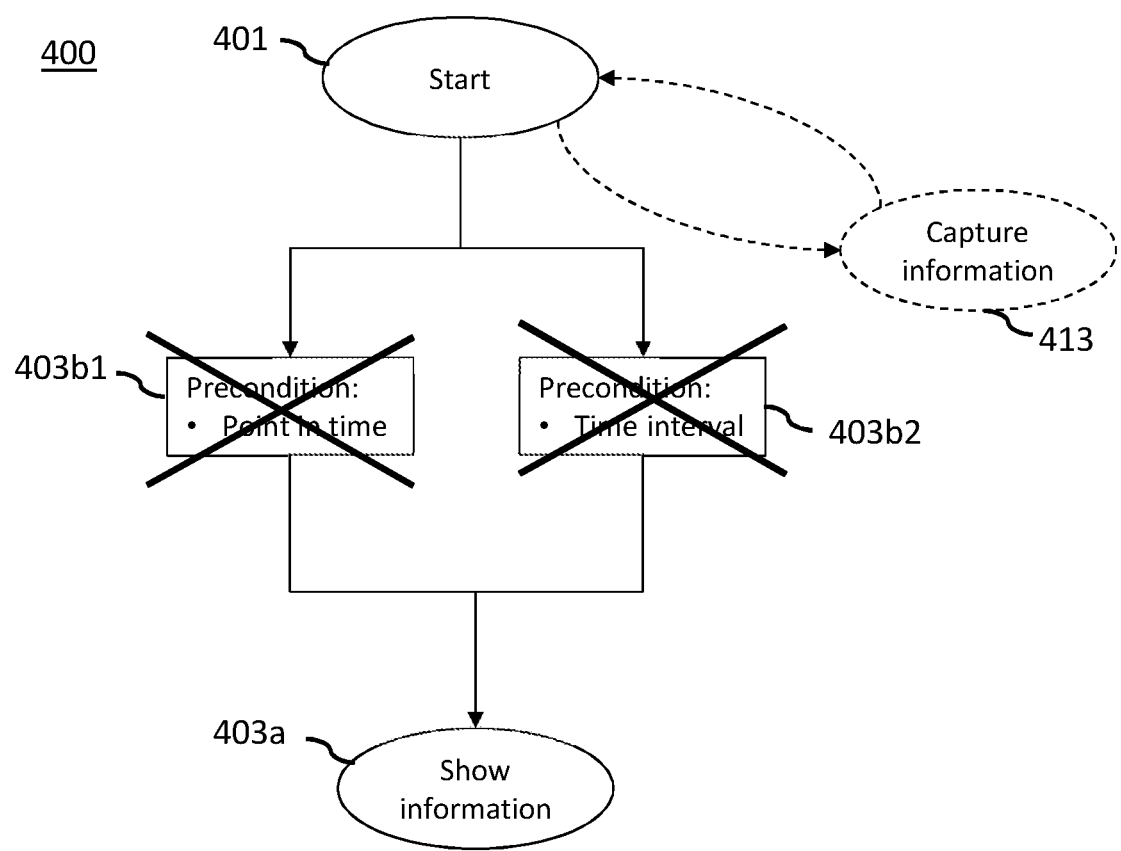
FIG. 5 illustrates the generation of a temporary node in a dialogue graph.

If at least one required parameter value is missing, the dialogue controller generates 1410 a temporary dialogue node to request the at least one missing parameter and stores 1420 the requested parameter in the context cache 160 upon receipt. That is, the context for the dialogue is iteratively enhanced by dynamically creating temporary dialogue interaction nodes for collecting additional precondition parameter values from the user. Turning briefly to FIG. 5 illustrating the generation of a temporary node in a dialogue graph, the dialogue recognizes that the user has not given any mandatory time information parameter with the received intent to show information. At this time, the context of the dialogue only includes the default value "alarms" for the list of data types precondition. Neither a "point in time" parameter 403b1 nor a "time interval" parameter 403b2 is known in the current context. Therefore, the mandatory precondition "time information" for the target node 403a is not fulfilled and the state transition from start 401 to show information 403a cannot be executed. The dialogue controller now generates the temporary node "capture information" 413 with an empty precondition and transitions to this node with the information of the required parameters. For example, the temporary node 413 may be rendered into a dialogue item in a graphical visualization 30 of the dialogue as: "please specify a point in time or a time interval!". However, the temporary node 413 is not persisted in the dialogue graph. In response to this interaction the user may provide as time interval for the mandatory precondition the intent input: "show me the last two days!". The intent determination module determines as the desired interaction to show the alarms for the time interval covering the last 48 hours. This parameter is now added to the context cache 160 and the transition to "show information" 403*a* can occur as the corresponding preconditions are fulfilled.

In case no further parameter values are missing (i.e., the respective precondition is fulfilled) the dialogue controller triggers 1500 an interaction 121 associated with the target node (e.g., 303*a*, 304*a*) to retrieve data about the technical state of the industrial system 200 as a response to the desired interaction associated with the target node. In the above example of FIGS. 3\* and 5, a query is launched through the data accessor interface 120 to the respective databases and or the industrial control system. It is to be noted that the databases DB1 to DB3 may from an integral part of the industrial control system 60, but may also be separate independent systems fed with technical state data (e.g., sensor data) of the industrial system 200. The query is directed to retrieve data as specified by the received intent complemented with the information stored in the context of the dialogue. In the example, alarm data for the specified time interval is retrieved. In case the user has specified further data types in response to the temporary interaction node "capture information" 413 (cf. FIG. 5), additional data may be retrieved in accordance with the user's specification as stored in the context cache.

The interface 110 now provides 1600 dialogue rendering information for presenting to the user 10 cognitive information 30 associated with the node which was most recently processed by the dialogue controller 140. In the previous example, in case of missing parameters, the above shown example dialogue may be rendered based on the information of the generated temporary node (information about the missing parameter(s)). Once all required preconditions are fulfilled to transition to the target node (e.g., "show information") the rendering information may include information about the parameter values of the respective precondition(s), the target node itself (e.g., where the node is located in the dialogue), and the technical status data retrieved in response to the desired interaction requested by the received intent input. A detailed rendering example is explained in FIGS. 9A to 9E showing specific examples of how the dialogue can be rendered in combination with respective technical status data reflecting the state of industrial system 200.

In one embodiment, the computer system 100 further has a session manager module 170. The session manager 170 can manage separate dialogue sessions for different users. In a real world industrial control system scenario typically multiple operators with different skills sets control and operate the industrial system. Each of such users has different needs with regards to the interaction with the computer system 100. Therefore, for each user logging into the system 100 a separate dialogue session can be generated.

Figure 4:
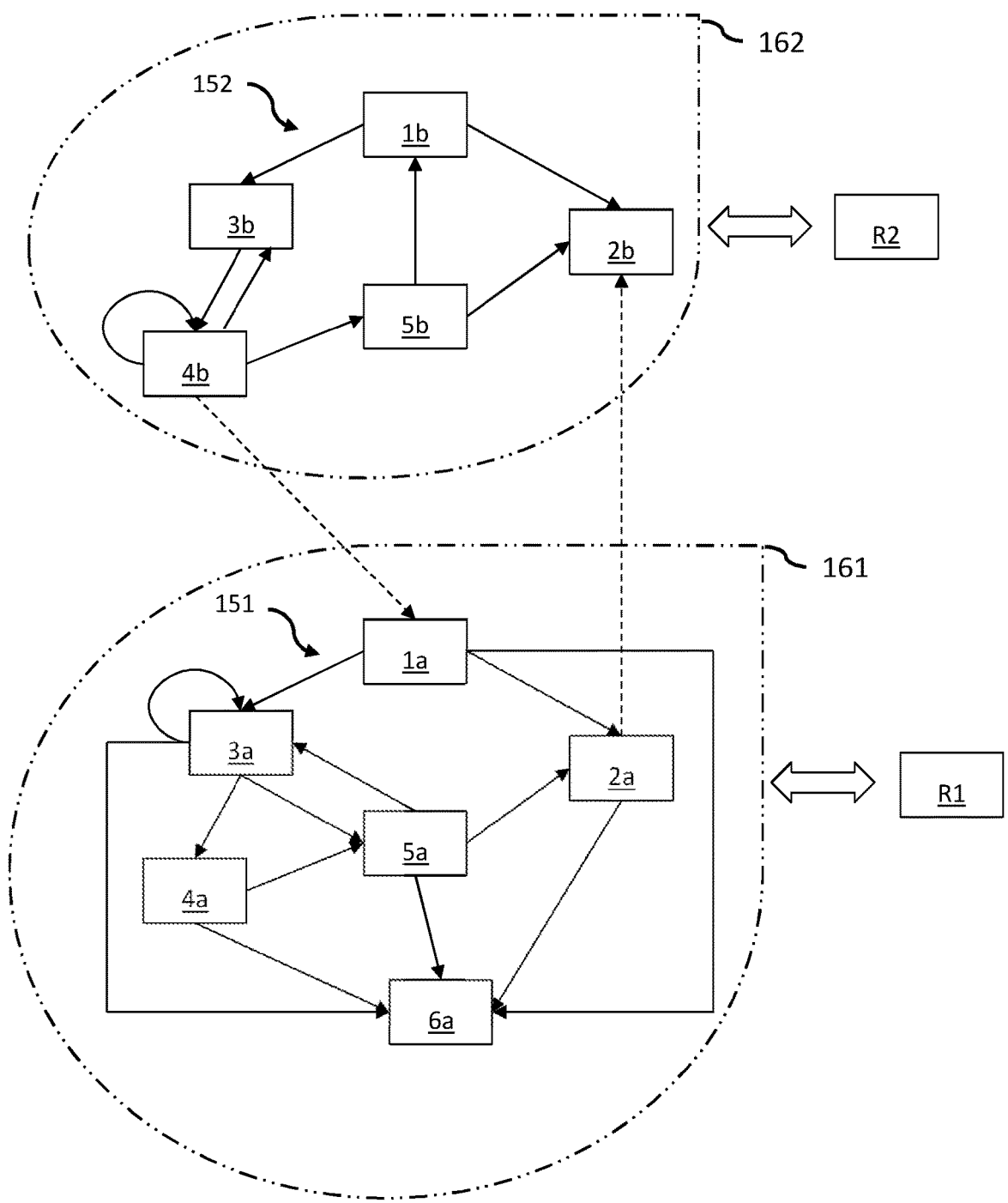
FIG. 4 shows two particular examples of dialogue graphs which are combined according to embodiments of the invention.

Turning briefly to FIG. 4, the session manager 170 can manage those sessions in parallel wherein each separate dialogue session uses a respective dialogue graph which is associated with one or more roles R1, R2 of the respective user. FIG. 4 shows two particular examples of dialogue graphs which are combined according to embodiments of the invention. In the example, a first dialogue graph 151 is associated with a first role R1 and a second dialogue graph 152 is associated with a second role R2. When the dialogues are instantiated each dialogue runs within its own context 161, 162, respectively. Some of the nodes of the dialogue graphs 151, 152 may be tagged as interface nodes. In the example, the nodes 1a, 2a and 4b, 2b are tagged as interface nodes (or inter-graph nodes). A node which is tagged as an interface node can transition into a state of another dialogue graph. In the example, node 4b of graph 152 can transition to node 1a of graph 151, and node 2a can transition to node 2b. In case a user having both roles R1, R2 logs into the computer system 100, both dialogue graphs are instantiated as dialogues within the same session for the user. To allow smooth interaction for the user with the computer system the dialogue controller can enable transitions 4b-1a, 2a-2b between the interface nodes 1a, 2a of the first graph 151 and the interface nodes 2b, 4b of the second graph 152 based on the respective tagging. Although two separate dialogue graphs are instantiated the interface node transitions allow that for the user the dialogue appears as a single dialogue. Disruptions in the technical tasks of the operators can thus be avoided.

FIG. 4 is now used to explain some advantageous features of optional embodiments of dialogue graphs. The dialogue graph 161 includes node 6a as a node that can be directly reached from all other nodes 1a to 5a of the dialogue graph 151 by respective transitions. This graph feature allows to include a help node in each dialogue which can always be reached independent from the current interaction of the user with the computer system 100. It can therefore be avoided that the user ends up in a deadlock situation where the user is stuck in a situation because of a system problem (e.g., the specified technical data cannot be retrieved because the respective database system is down) or lack of knowledge about how to handle the situation. This type of node makes the dialogue control robust against technical insufficiencies as well as mal-operation by the user. In order to always reach such "help" nodes it is advantageous to have an empty precondition associated with such nodes for all transitions. For such nodes, having the precondition associated with the target node itself rather than with all transitions is advantageous as it only requires a single precondition definition for the target node. Beyond the "help" functionality other node types exist which also benefit from the same implementation. Examples of other node types are nodes for adding comments to the dialogue (a user may, at any time in a running dialogue, ask to add a comment and the dialogue controller can transition to the respective "add comment" node), or "remind me" nodes where the user, at any time in a running dialogue, asks the system to remind her/him of a certain topic.

A further dialogue graph feature can be seen for the nodes 3a, 4b. Such nodes can perform a self-loop transition. That is, for such nodes represent the first state and the second state of a state transition. An example was given earlier with the "show information" node being defined as a self-loop node. This allows that the same node can be used to stepwise increase the granularity of the retrieved/shown data by transitioning to itself with additional precondition parameters in every subsequent step. For example, the optional parameter with the list of data types can be complemented with additional or different data types in subsequent "show information" steps to perform a drill down into the data. Thereby, the user always interacts with the same dialogue node but with varying preconditions (and varying information that is rendered).

A further dialogue graph feature can be seen for the nodes 3a, 4a, 5a. The node 3a can reach itself via a circular path 3a-4a-5a-3a passing one or more other nodes 4a, 5a of the graph 151. Such circular paths can be useful to keep the dialogue graphs small and manageable because they allow to model iterations in a dialogue structure without a need to design repeating graph sections which may only differ in terms of precondition parameters.

Coming back to FIG. 1, in an recommendation embodiment, the dialogue controller 140 can check 1700 for potential recommendations to a user. Such recommendations may show possible options regarding the further exploration of the technical state data reachable from the current node. Assuming that the dialogue has reached the target node associated with the desired interaction of the respective intent input (precondition(s) fulfilled), the dialogue controller can check 1710 if further nodes of the graph are reachable from the reached target node. If not, the rendering information remains the one which resulted from the interaction with the target node. If yes, the dialogue controller can identify 1720 potential desired interactions associated with the further nodes. A further check 1730 may be performed to evaluate in advance if any meaningful technical data is available for pre-fetch (that is without explicit request through an intent input). If no such meaningful data is available, simply the interactions of the reachable nodes may be assembled 1800 into the dialogue rendering information and presented to the user together with the information provided by the target node interaction. However, if meaningful data are available for one or more of the further nodes which is suitable to support the operator to decide if a transition to the respective dialogue state can be useful, such technical state data can be retrieved 1740 by a pre-fetch module 180 of the computer system 100. Of course, this requires all parameter values for transitioning to one of the further nodes to be available in the context cache. The pre-fetcher 180 makes use of the data accessor 120 to anticipate the state transition to a particular further node and to retrieve the respective technical state data (if precondition is fulfilled). Such data can the also be merged into the recommendations to be assembled together with the rendering information of the current node (i.e. the target node of the most recently received intent input). Recommendation examples are given in the description of FIG. 6.

Figure 7A:
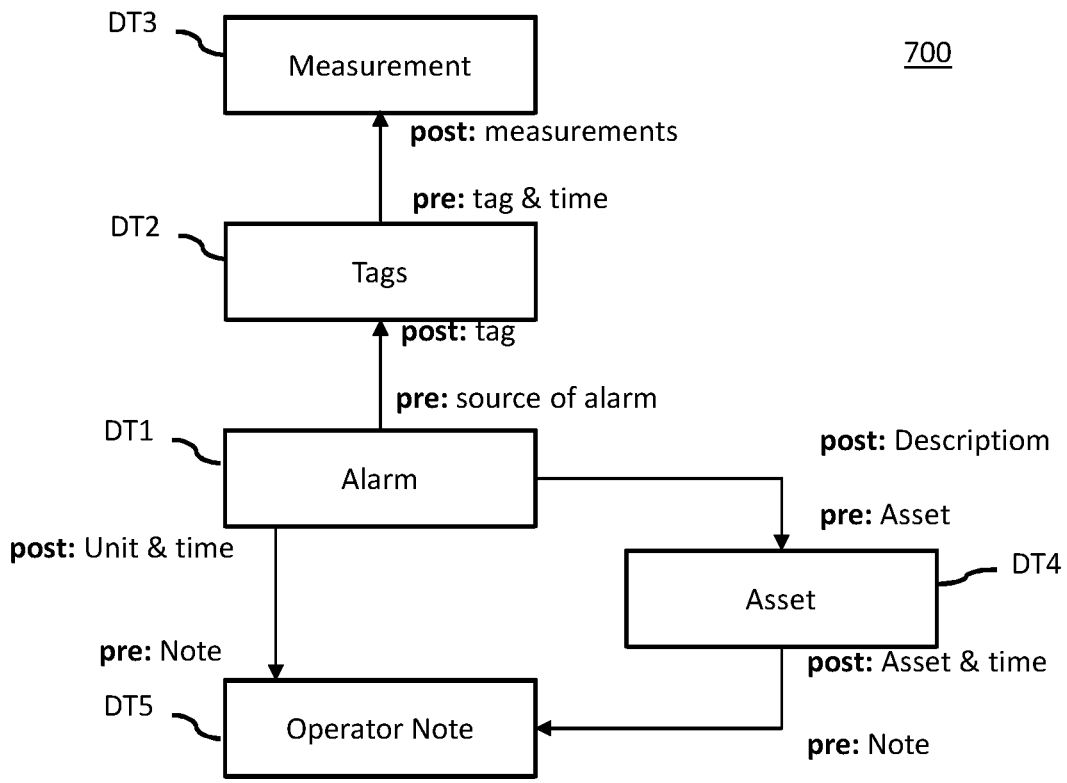
FIG. 7A shows a particular example of a data graph used for recommendations.
Figure 7B:
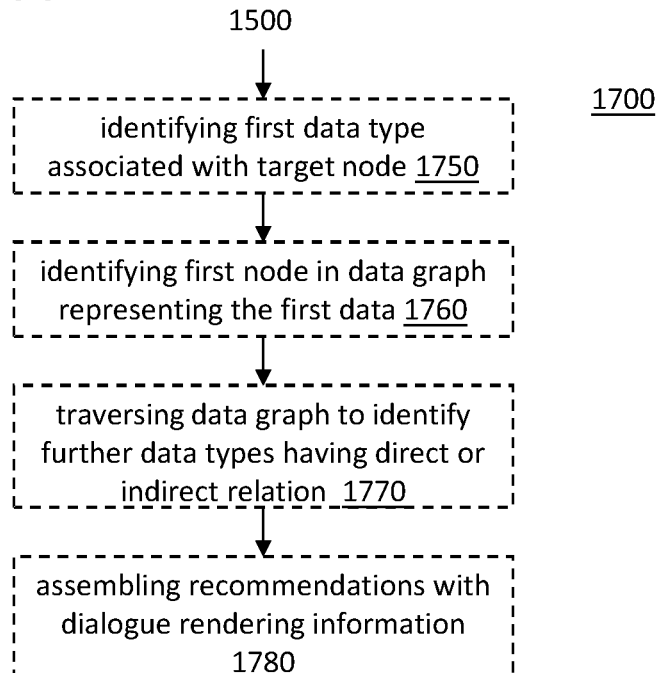
FIG. 7B is a simplified flowchart illustrating the steps for generating recommendations based on data type relations according to an embodiment.

In a further recommendation embodiment, recommendations can be generated as illustrated in FIGS. 7A, 7B. FIG. 7A shows a particular example of a data graph 700 which may be used for generating recommendations. FIG. 7B shows a simplified flowchart illustrating the steps for generating recommendations according to an alternative embodiment of the checking for recommendations step 1700.

In the example of FIG. 7A, the predefined data graph 700 represents relations between data types of data related to the industrial system (e.g. a chemical plant). In general, predefined data graphs reflecting the industrial system data relations can be stored in the data storage of the computer system and can be accessed by the dialogue controller. Each node DT1 to DT5 of the data graph 700 corresponds to a particular data type. Each edge of the data graph has a precondition specifying an allowed query parameter for a particular query to retrieve respective data about the technical state of the industrial system, and has a post-condition specifying a return data type of the particular query. The root node of the data graph 700 example is "Alarm" DT1. The data graph structure may be used to proactively recommend additional relevant data for visualizing the state of a complex technical system like a chemical plant to the user/operator to indicate what data might be promising for the user to look next.

In other words, the data graph 700 defines with what queries it is possible to navigate from one data type to another. The precondition of the respective data type transition specifies query parameters like tag name or a time interval. The post condition specifies the data type which is returned by said query. In the example of FIG. 7A, the entry node into the data graph is DT1 "Alarm". From there the following transitions exist:

Alarm→Tags→Measurements
Alarm→Operator Note
Alarm→Asset→Operator Note

For example, to move from the current data type DT1 to DT2 tags, a query for the source of alarm is used which provides a tag as return value. To finally arrive at the measurement values (DT3 "Measurement") a query with the tag and with time information can be launched to finally retrieve the respective measurement values.

The recommender function can traverse the data graph 700 similar to an artificial intelligence (AI) planner to reach from the data type currently shown to the user (e.g., DT1 alarms as the entry node) to possibly other interesting data types. The traversed links (transitions) of the data graph correspond to a series of queries that need to be executed against the respective databases. For example, if the user is presented an alarm list, the recommender might build the following series as recommendations:

Alarm→Tags→Measurements
Alarm→Operator Note
Alarm→Asset→Operator Note

FIG. 7B show the corresponding simplified flowchart for running this recommender function of the dialogue controller. The dialogue controller identifies 1750 a first data type (e.g., "Alarm") associated with the reached target node of the dialogue graph. Then, a first node DT1 in the data graph 700 representing the first data type ("Alarm") is identified 1760. The data graph is traversed 1770 to identify further data types (DT2 to DT5) having a direct or indirect relation with the first data type node DT1. Finally, the identified further data types are assembled 1780 together with the dialogue rendering information for the target node as a recommendation to the user for potential queries to retrieve respective data about the technical state of the industrial system. As a result, the dialogue controller may generate, for example, a recommendation to view matching measurements or operator notes to the user. As an optional step, the recommender function might check if there actually is relevant data or even pre-fetch the data similar to the first recommendation embodiment described above.

Figure 8A:
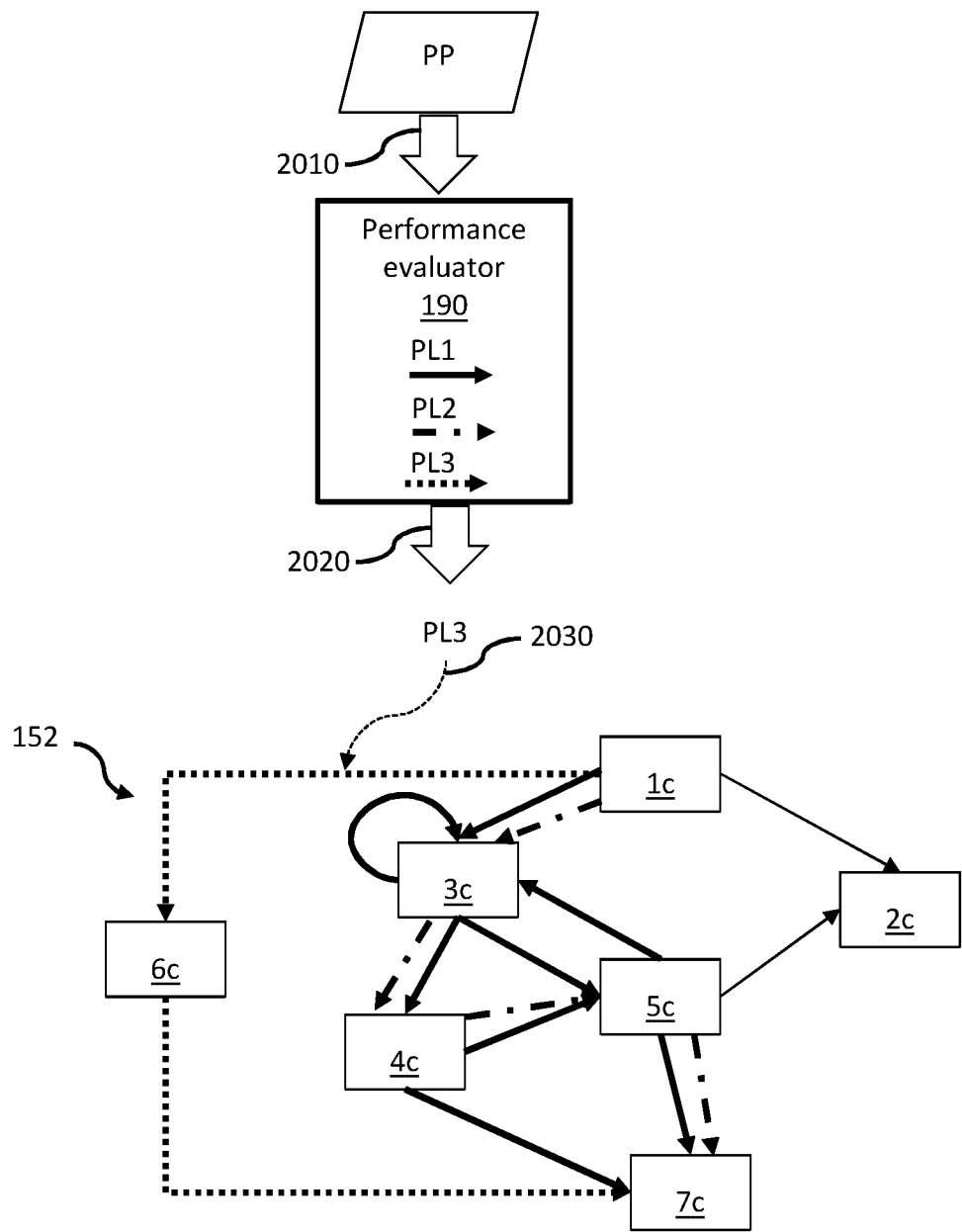
FIG. 8A illustrates performance based path selection for an example dialogue graph.

Turning back to FIG. 1, in an embodiment, the computer system may have a performance evaluator module 190. As mentioned earlier, the physical/mental condition of the user can influence his or her performance ability. The condition can be determined by evaluating physical and other parameters and/measurement values reflecting the user's condition. The term "physical parameter" as used herein refers to parameters and/measurement values reflecting the user's physical/mental condition. The performance evaluator 190 is explained in more detail in FIG. 8A illustrating performance based path selection for an example dialogue graph 152. The performance evaluator 190 receives 2010 one or more physical parameters PP characterizing the current physical condition of the user. There are well known capturing devices with sensors for capturing physical parameters including but not limited to:

Heart rate (primary, if available)
Pitch/Variation in the voice (primary)
current status of (overall) system, i.e. current rate of alarms (primary)
Speed of interactions and response times of the user (primary)
Speed of input (e.g. word per minute)—(secondary)
Length of input—(secondary)

choice of words/specific utterances (secondary)
pupil dilation/contraction (secondary, if available)
Respiration (secondary, if available)
Skin surface resistance (secondary, if available)
history in interaction, like repeated (secondary)

Other factors may also be indicative of the user's physical condition, such as for example particular system settings in the computer system or the skill/experience level of a user. Based on the received physical parameters PP the performance evaluator can determine a current performance level PL3 for the user. The determined performance level corresponds to one out of a plurality of predefined performance levels known by the performance evaluator. In this embodiment, the dialogue graph 152 includes alternative dialogue paths 1c-3c-4c-7c, 1c-3c-4c-5c-7c, 1c-6c-7c for a particular desired interaction associated with the target node 7c. Each alternative path is associated with a predefined performance level PL1, PL2, PL3 of the user. In the example, path 1c-6c-7c is associated with PL3, path 1c-3c-4c-7c with PL1, and path 1c-3c-4c-5c-7c is associated with PL2. For example, the various state transitions can be tagged with the respective performance levels they are assigned to. The performance evaluator can now select 2030 the alternative path 1c-6c-7c which is tagged with the predefined performance level PL3 matching the determined performance level PL3 of the user.

The performance evaluator allows the dialogue controller to adapt to the user's current physical condition and present dialogues with the appropriate level of complexity. This avoids overburdening the user with dialogue complexity which he would not be able to cope with in the current physical condition.

Instead of the embodiment shown in FIG. 8A where predefined performance levels are used to select appropriate dialogue paths for the user dependent on the user's physical condition. In one embodiment, the performance evaluator may pursue a simpler strategy for performance based dialogue adaptation. A predefined performance level threshold may be used to always select a shortest dialogue path in cases where the determined performance level of the user falls below the performance level threshold.

However, the shortest dialogue path does not necessarily correspond with the lowest number of dialogue states on the path. Rather, it is the number of dialogue interactions with the computer system which has an exhausting effect on the user. Therefore, the shortest dialogue path can be defined as the path in the dialogue graph which reaches a node for a desired interaction with the lowest number of interactions in view of the available dialogue context. Alternative criteria to define the shortest dialogue path include:

the least data-consuming path (number of entries or interaction from the user), or the least data presenting path (number of data to be shown to the user)

Figure 8B:
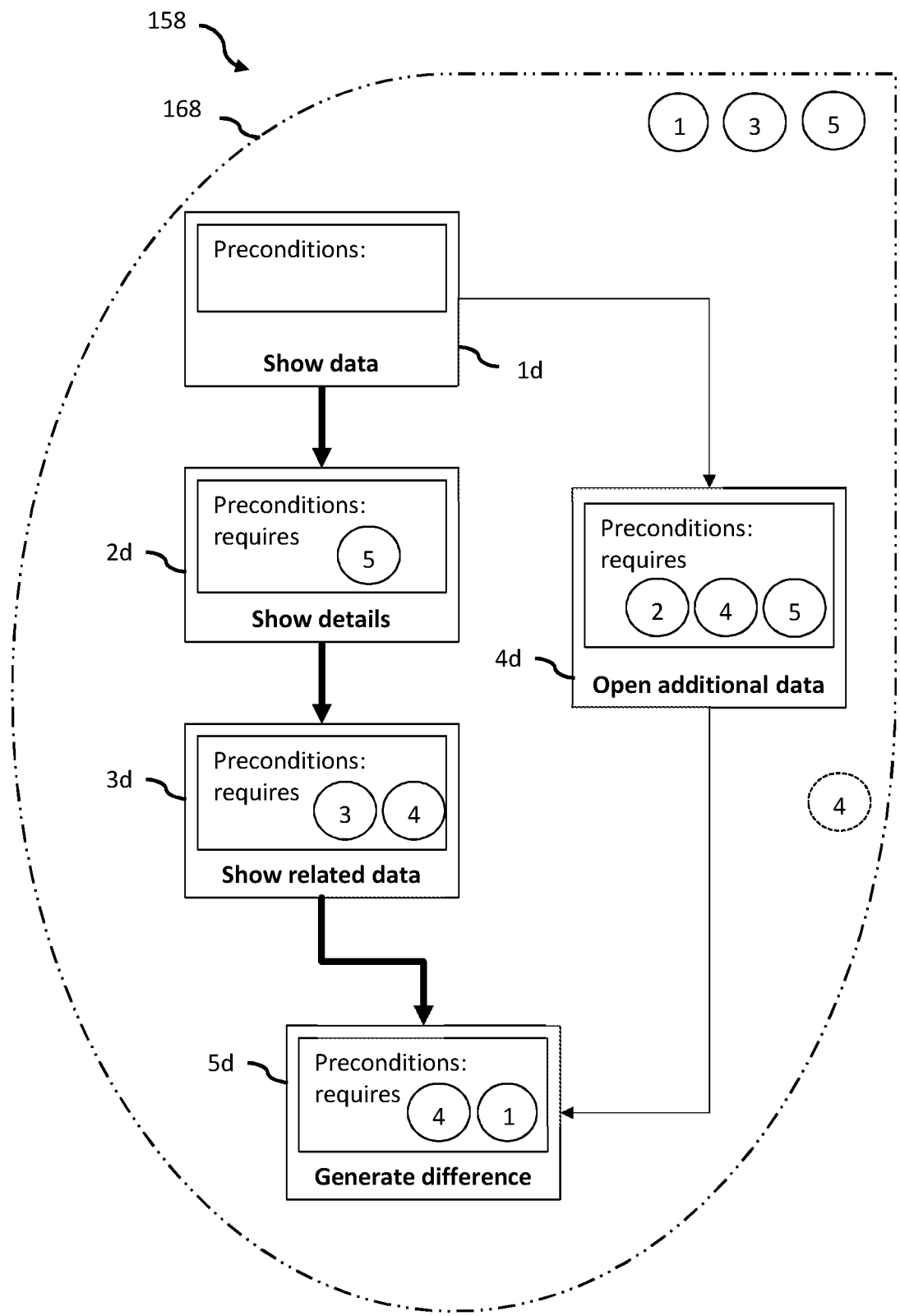
FIG. 8B illustrates shortest path computation in an example dialogue graph.

In the following, an example for the first definition of a shortest path is given. In the example of FIG. 8B, the context 168 of the instantiated dialogue based on dialogue graph 158 includes the parameter values (1), (3), (5) (illustrated as circles with respective numbers). The received user intent asks for generating a difference of particular data sets which is mapped to the node 5d as the target node.

The goal is to determine the shortest dialogue path from the start node 1d to the target node 5d. The alternative paths are 1d-2d-3d-5d and 1d-4d-5d. At a first glance the second alternative looks like the shortest path. However, the preconditions of the respective dialogue states need to be taken into consideration. When selecting the allegedly shortest path 1d-4d-5d, only the parameter (5) is available in the current context 168. That is, the dialogue controller generates two additional dialogue steps by generating respective temporary nodes to collect the missing parameters (1) and (3). This will cause at least two additional dialogue interactions for the user.

When looking at the alternative path 1d-2d-3d-5d, the only missing parameter value is (4). Only in step 3d an additional dialogue step is inserted (temporary node) to collect the missing data (4). Therefore, the dialogue controller decides for 1d-2d-3d-5d as shortest path which would be appropriate for the user's current physical condition. Node 2d does not require any interaction because the computer system can provide the requested data based on context parameter (5). Node 5d does not require any interaction because at the time node 5d is executed, the missing parameter (4) is already added to the context (dotted circle) from the interaction triggered by node 3d. That is, only a single interaction occurs on the selected shortest path (bold transition arrows).

Figure 6:
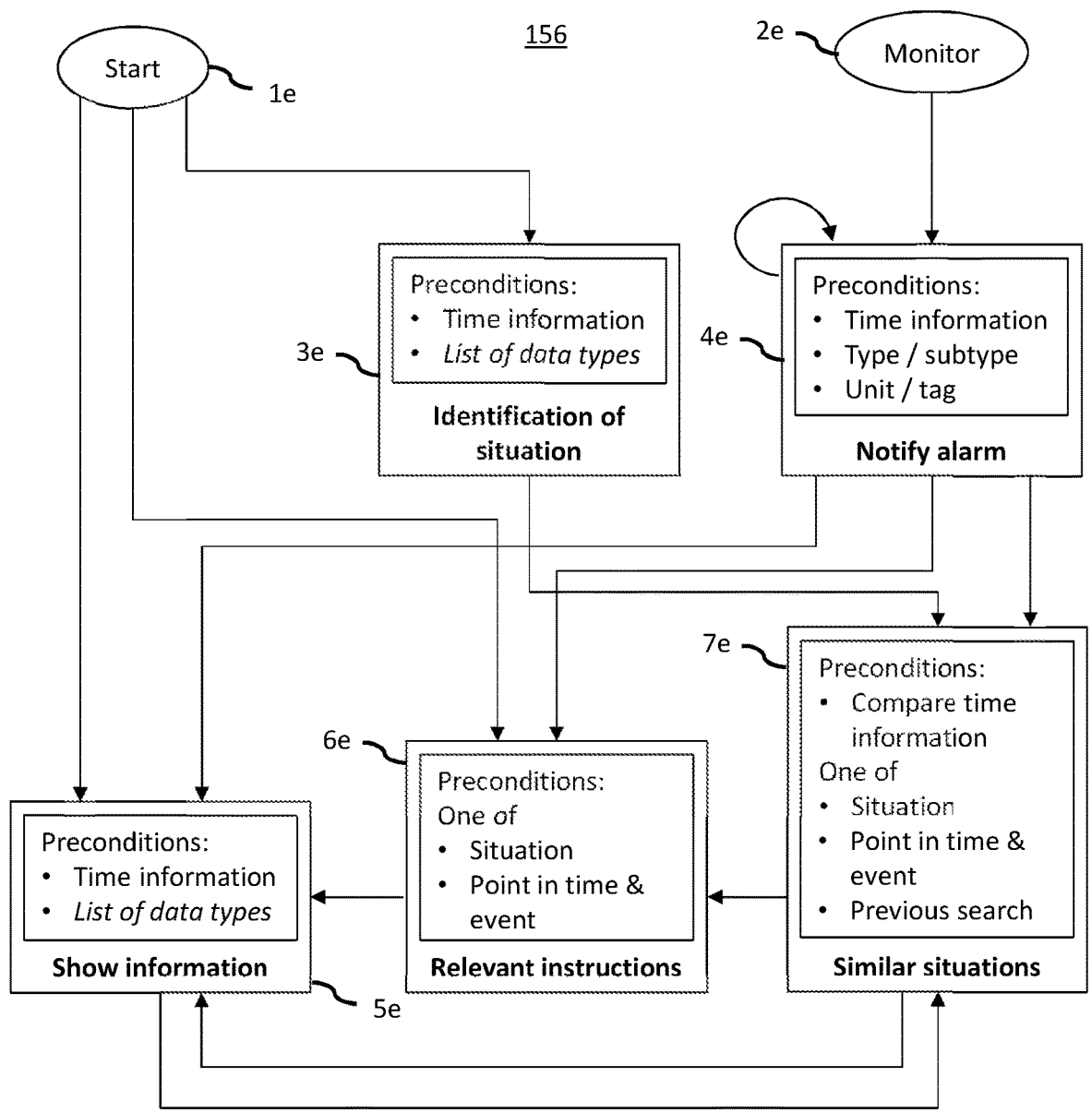
FIG. 6 shows a particular example of a dialogue graph.
Figure 6:

FIG. 6 shows a particular example of a dialogue graph 156. The example dialogues described in the following tables T1 to T3 are controlled by the dialogue controller based on the dialogue graph 156. The different rows of the tables correspond to dialogue interaction steps and are numbered. In the description, the steps are referred to Tn.m. That is, the first row of table T1 is referred to as T1.0. In the first column of the tables the actor is shown (i.e. who is actively communicating in the respective row—either the computer system 100 (System) or the User). In the second column an example text (Message) of the rendered dialogue information is given for the respective step. The messages are rendered in a dialogue display or audio output for the user/operator. In the third column the available context (content of the context cache) for the respective dialogue interaction is listed. In the fourth column, the name of corresponding dialogue node is shown.

The first example described in T1 starts with an initialization step T1.0 which clears the context if needed (context=Empty) and sets the current node to the start node 2e (Monitor). The start node may be selected dependent on the intent input channel from which the intent input is received. In this example, the system initiates the dialogue instantiation in T1.1. The context is filled with system data specifying the data type "alarm" with a subtype "pressure, high" and some further parameters associated with the alarm. The computer system recognizes that the dialogue is initiated through the monitoring intent channel and, based on the received intent data, recognizes that a transition from the corresponding entry node 2e to the target node 4e ("notify alarm") is intended. All preconditions of the target node can be fulfilled by the context data received with the intent input. The computer system can include or link to a text library of predefined node related dialogue text templates which can then be completed with the corresponding context data. In the example, the computer system generates a message for the user "There is a unusual rise of pressure in unit XX5. Do you want to investigate?" to start the interactive dialogue with the user.

TABLE 1

| | | (T1): system initiated dialogue with recommendations | |
|---|---|---|---|
| Actor | Message | Context | Node |
| 0. | | Empty | Monitor |
| 1. System | There is a unusual rise of pressure in unit XX5. Do you want to investigate? | time frame: 13.02.2018 09:50-13.02.2018 10:05 type: alarm subtype: pressure, high unit: XX5 tag: PC 1234 | Notify Alarm |
| 2. User | Yes. What are my options? | time frame: 13.02.2018 09:50-13.02.2018 10:05 type: alarm subtype: pressure, high unit: XX5 tag: PC 1234 find reachable nodes | Notify Alarm |
| 3. System | Preferred options are: * Show signal information * Search for relevant instructions * Search for similar situations | time frame: 13.02.2018 09:50-13.02.2018 10:05 type: alarm subtype: pressure, high unit: XX5 tag: PC 1234 | Notify Alarm |
| 4. User | Show signal | time frame: 13.02.2018 09:50-13.02.2018 10:05 type: alarm subtype: pressure, high unit: XX5 tag: PC 1234 list of data types: "signals (PC 1234)" | Show Information |
| 5. System | Showing signal (PC 1234). | time frame: 13.02.2018 09:50-13.02.2018 10:05 type: alarm subtype: pressure, high unit: XX5 tag: PC 1234 list of data types: "signals (PC 1234)" | Show Information |
| 6. User | Are there similar situations in the last 6 months? | time frame: 13.02.2018 09:50-13.02.2018 10:05 type: alarm subtype: pressure, high unit: XX5 tag: PC 1234 list of data types: "signals (PC 1234)" compare time frame: 12.09.2017 00:00-12.02.2018 23:56 | Similar Situations |
| 7. Systems | There are five similar situations, four of them reference the same instruction manual. Do you want to view the instruction? | time frame: 13.02.2018 09:50-13.02.2018 10:05 type: alarm subtype: pressure, high unit: XX5 tag: PC 1234 list of data types: "signals (PC 1234)" compare time frame: 12.09.2017 00:00-12.02.2018 23:56 similar situations: . . . frequent references: "manual (id: 123456)" queued node: Show Information | Similar Situations |
| 8. User | Yes. | timeframe: 13.02.2018 09:50-13.02.2018 10:05 type: alarm subtype: pressure, high unit: XX5 tag: PC 1234 list of data types: "manual (id: 123456)" compare time frame: 12.09.2017 00:00-12.02.2018 23:56 similar situations: . . . frequent references: "manual (id: 123456)" | Show Information |
| 9. System | Showing instruction manual. | time frame: 13.02.2018 09:50-13.02.2018 10:05 type: alarm subtype: pressure, high unit: XX5 tag: PC 1234 list of data types: "manual (id: 123456)" compare time frame: 12.09.2017 00:00-12.02.2018 23:56 similar situations: . . . frequent references: "manual (id: 123456)" | Show Information |

In T1.2, the user asks for options which is interpreted by the intent determining module as a request for finding reachable nodes that can be reached from node 4e. In T1.3 the computer system responds after as self-loop transition with the requested recommendation listing potential desired interactions associated with the reachable nodes 5e, 6e, 7e. Alternatively, the computer system could have assembled T1.1 and T1.3 into a single rendering information package to be rendered by the front end in a single dialogue element.

In T1.4, the user decides for the first recommendation and provides the intent input "Show signal" which is mapped to the node 5e "Show information". The preconditions for the respective transition are fulfilled because the context already includes the required time information and specifies the respective signal of interest "PC1234".

In T1.5, the system responds to the intent input with the technical data for the requested signal. For example, a graph showing the signal data over time during the specified time interval can be merged into the corresponding rendering information.

At this point, the presented information is not yet enough for the user to explain the reason for the alarm. To further explore the situation, the user asks for similar situations in the last 6 months (intent input T1.6). This intent input is mapped to the "similar situations" node 7e. The preconditions of node 7e are fulfilled by the current context because the "last 6 months" provides the required parameter value for the "compare time information" precondition. The transition to node 7e therefore occurs.

As a system response, the computer system retrieves in T1.7 the information form the respective data source(s) that five similar situations occurred during the specified time interval. At the same time, the query provided the information that in four cases the same instruction manual was referenced. Such intelligent queries are frequently used in scenarios like root cause analyses in industrial systems. The example shows how the result of the query which is executed for retrieving the technical data from the technical data source(s) is also used to further enhance the dialogue context. That is, besides the options to enhance the context via user intent inputs or monitoring intent inputs, each data retrieval by a query which is executed when transitioning to the respective target node can enhance the context with the retrieved information.

In T1.8, the user confirms the computer system's suggestion to view the instruction which seemed to be relevant in similar situations. The dialogue controller transitions back to the respective "show information" node 5e and finally shows in T1.9 the instruction manual to the user. All preconditions were fulfilled by the available context.

The second example described in T2 relates to a dialogue which is initiated by the user. In this scenario, the initially context is not provided by a monitoring intent input. Rather, the user performs a manual exploration of the technical data and is building the context content stepwise.

TABLE 2

(T2): dialogue with manual exploration

| Actor | Message | Context | Node |
|---|---|---|---|
| 0. | | Empty | Start |
| 1. User | Search for similar situations | <missing data><br>Queued node: Similar situations | Start |
| 2. System | Insufficient information. Please specify, using one of the following templates:<br>* situation<br>* point in time and event<br>* reference to a past search<br>By default the search horizon is set to the last six month and using a strict matching policy. You may also | <missing data><br>Queued node: Similar situations | Start |
| 3. User | Target situation is high pressure from this morning. Expand time range to 2 years. | time frame: 13.02.2018 08:00-13.02.2018 13:00<br>type: alarm<br>subtype: pressure, high compare time frame: 13.02.2016 00:00-12.02.2018 23:56<br>queued node: Similar situations | Identification of Situation |
| 4. System | Started identification of the situation. Please stand by . . . | time frame: 13.02.2018 08:00-13.02.2018 13:00<br>type: alarm<br>subtype: pressure, high queued node: Similar situations | Identification of Situation |
| 5. System | Found an matching event and searching for similar situations. Please stand by . . . | timeframe: 13.02.2018 09:50-13.02.2018 10:05<br>type: alarm<br>subtype: pressure, high<br>unit: XX5<br>tag: PC 1234 | Similar situations |
| 6. System | There are five similar situations and there they are. | time frame: 13.02.2018 09:50-13.02.2018 10:05<br>type: alarm<br>subtype: pressure, high<br>unit: XX5<br>tag: PC 1234<br>list of data types: "signals (PC 1234)"<br>compare time frame: 12.09.2017 00:00-12.02.2018 23:56<br>similar situations: . . .<br>frequent references: "manual (id: 123456)" | Similar Situations |

In this scenario, the dialogue is initiated by a user intent input through the user intent channel. Therefore, the dialogue controller initializes the start node 1e as the entry point into the dialogue graph. At T2.0 the context is empty. In T2.1 the user intent "Search for similar situations" is received. The desired interaction is mapped to the node 7e. The system remembers this node as queued target node because there is no direct transition from the start node 1e to target node 7e. However, as neither the user input intent nor the empty context cache can provide any parameter values for the preconditions of node 7e, missing data is detected and the dialogue controller cannot yet transition to node 7e. A temporary dialogue node is therefore generated in T2.2 to query the user for the missing parameter values needed for a transition to node 7e. In the persisted dialogue graph 156 the temporary nodes are not visible. Therefore, the current node is still the start node 1e.

In T2.3, the user provides a detailed specification of the situation triggering the previous user intent input. The provided information is used to fill the context accordingly. The received user intent is now mapped to node 3e which is on the path to the initially determined target node. As the user has provided the context required by node 3e and the dialogue controller knows that the user intends to retrieve information on similar situations at node 7e, the system simply sends a feedback to the user in T2.4 telling the user that is identifying the situation and then directly transitions in T2.5 to the target node (which is the queued node in the context of the previous step T2.4). As the data retrieval queries associated with node 7e may consume some time, the dialogue controller provides a status notification to the user and finally, in T2.6, provides the result of the similar situation analysis query. In the rendering information a dialogue confirmation about five similar situations is assembled together with the retrieved data (e.g., data charts) showing the similar situations.

In the following example of T3, it is assumed that the performance evaluator has detected a physical condition of the user which leads to a reduced performance level of the user. Therefore, a simplified dialogue is provided to the user. However, in this example the dialogue path is the same as in T2. Only the message information provided by the computer system to the user in the respective rendering information is shortened or suppressed entirely (e.g., T3.5).

TABLE 3

(T3): dialogue with manual exploration under stress

| Actor | Message | Context | Node |
|---|---|---|---|
| 0. | | Empty | Start |
| 1. User | Search for similar situations | <missing data><br>Queued node: Similar situations | Start |
| 2. System | Please specify reference. | <missing data><br>Queued node: Similar situations | Start |
| 3. User | High pressure event, this morning. | time frame: 13.02.2018 08:00-13.02.2018 13:00<br>type: alarm<br>subtype: pressure, high compare time frame: 13.09.2017 00:00-12.02.2018 23:56<br>queued node: Similar situations | Identification of Situation |
| 4. System | Searching . . . | time frame: 13.02.2018 08:00-13.02.2018 13:00<br>type: alarm<br>subtype: pressure, high<br>queued node: Similar situations | Identification of Situation |
| 5. System | no visual update | time frame: 13.02.2018 09:50-13.02.2018 10:05<br>type: alarm<br>subtype: pressure, high<br>unit: XX5<br>tag: PC 1234 | Similar situations |

TABLE 3-continued (T3): dialogue with manual exploration under stress

| Actor | Message | Context | Node |
|---|---|---|---|
| 6. System | 5 situations found and details are listed. | time frame: 13.02.2018 09:50-13.02.2018 10:05<br>type: alarm<br>subtype: pressure, high<br>unit: XX5<br>tag: PC 1234<br>list of data types: "signals (PC 1234)"<br>compare time frame: 12.09.2017 00:00-12.02.2018 23:56<br>similar situations: . . .<br>frequent references: "manual (id: 123456)" | Similar Situations |

FIGS. 9A to 9E illustrate a user interface example used for controlling the dialogue at different time points during the dialogue between a user and the computer system.

Figure 9A:
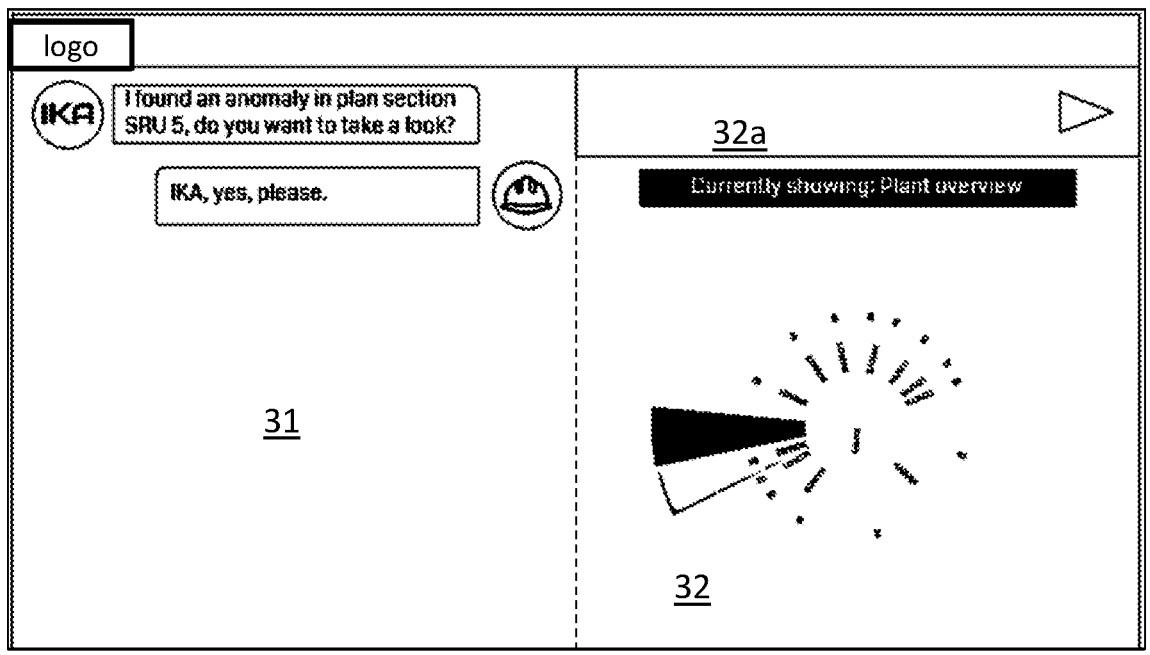
FIGS. 9A to 9E illustrate a user interface example used for controlling the dialogue at different time points during the dialogue of a user with the computer system.

FIG. 9A shows the dialogue display part 30 of the frontend used by the user to lead the dialogue with the computer system. The dialogue display has two major portions 31, 32. On the left portion 31 the messages of the dialogue participants are shown in a typical chatbot like layout. This portion is used to render the message part of the rendering information provided by the dialogue controller. On the right portion 32, the retrieved technical state data can be visualized. The upper portion 32a of the right portion may be used for visualizing indicators about the current state of the running dialogue instance. The reference numbers are only included in FIG. 9A but refer to the same portions of the remaining FIG. 9* figures.

In the example layout, the dialogue messages of the computer system are indicated by the "IKA" logo. The messages of the user are indicated by the logo with a helmet. The example shows a scenario similar to the scenario described in T2 where the dialogue is initiated by the IKA system prompting the user that an anomaly was found. Together with this message a plant overview is shown which highlights sections of the plant affected by the found anomaly. The user confirms the intention to have close look.

Figure 9B:
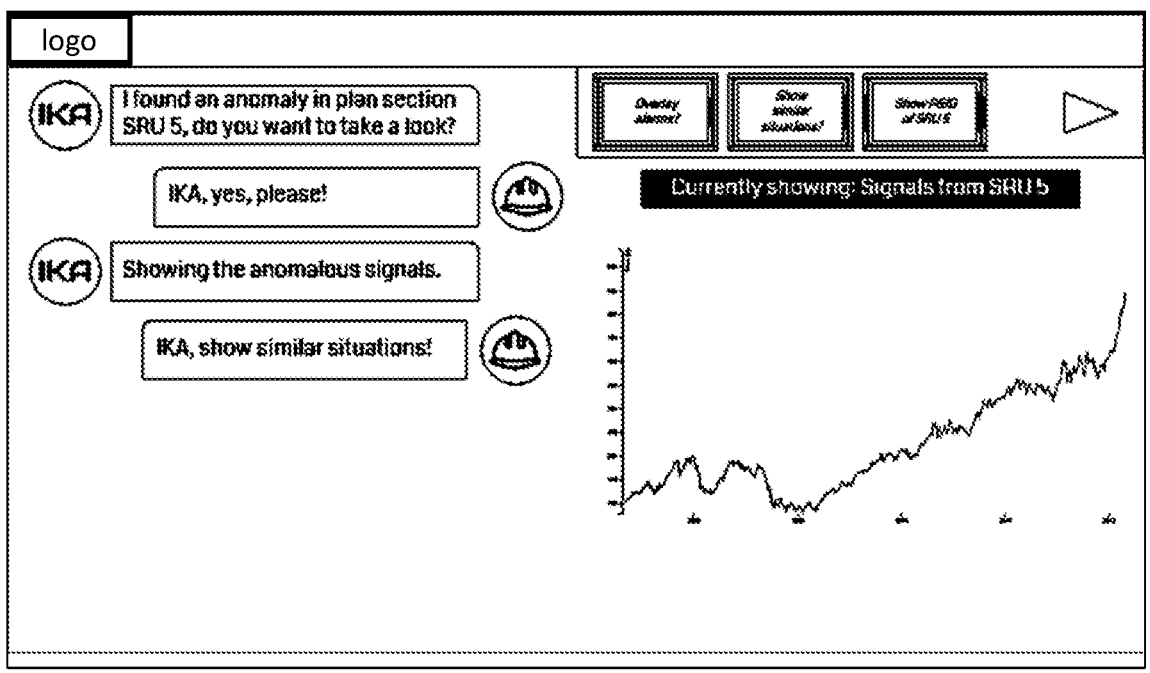

In FIG. 9B, the next two dialogue interactions have been processed by the dialogue controller. In the data portion the retrieved signals from plant section SRU 5 are shown. The dialogue state indicators in the upper right portion illustrates the nodes of the dialogue graph which led to the current dialogue state "Show PGID of SRU 5".

Figure 9C:
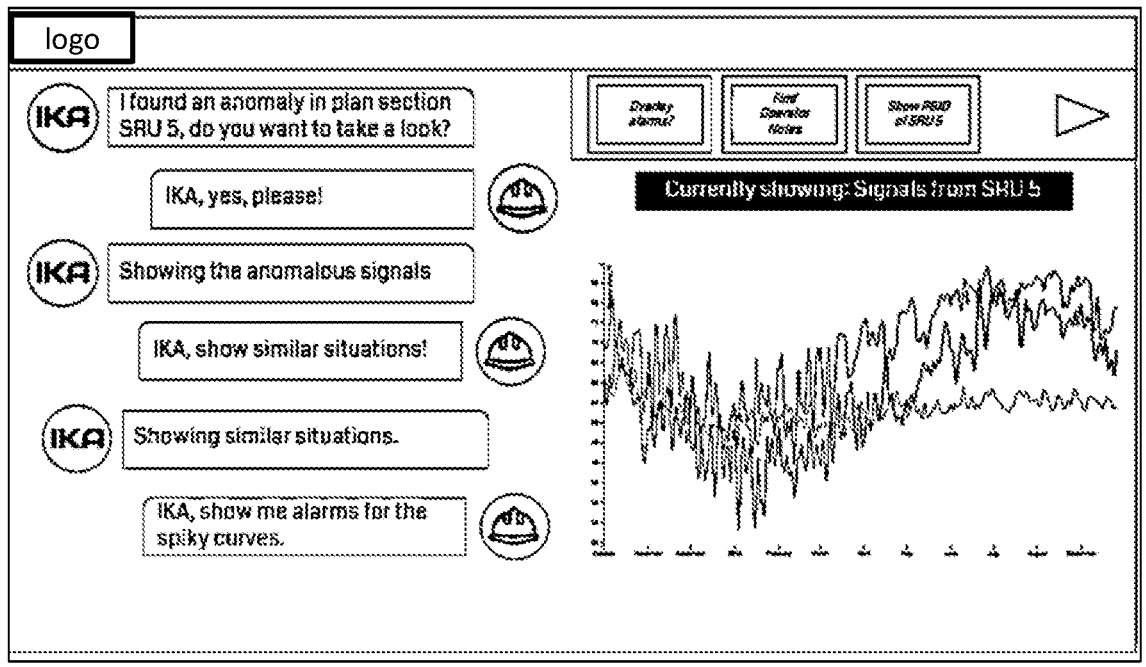

FIG. 9C illustrates the display after another two dialogue interactions. The IKA system has retrieved technical state data of similar situations and the user request alarms for spiky curves in the displayed data.

Figure 9D:
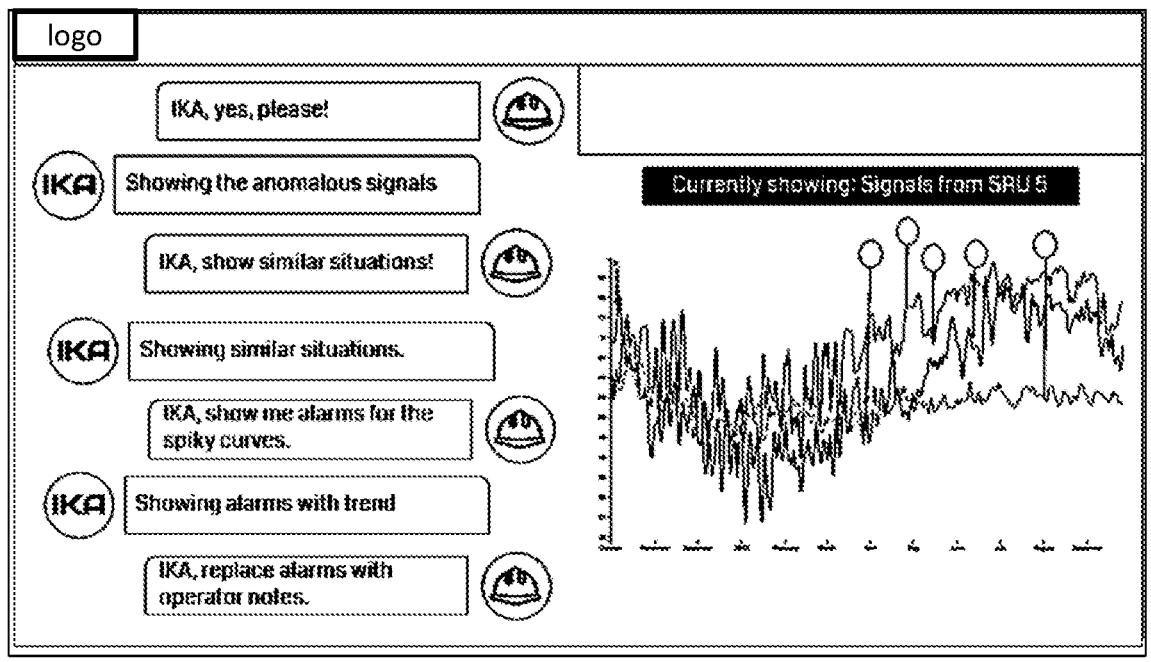

In FIG. 9D the IKA system has retrieved further data which indicators (needle symbols) for alarms with trend. The user requests to replace the alarms with associated operator notes.

Figure 9E:
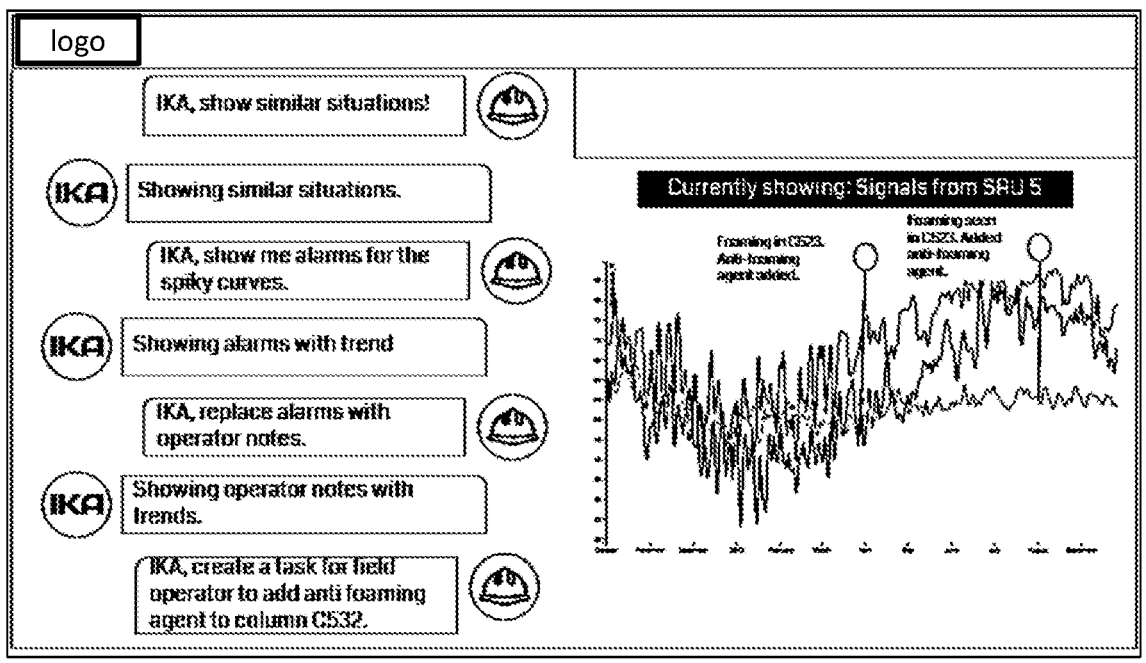

FIG. 9E shows the result of the IKA system's response where some of the needle symbols were replace by text portions with the respective operator notes. Based on such information the user finally creates a task for a field operator to take corrective action in response to the visual indicators visualizing the technical state of the industrial system.

With this iterative explorative dialogue based analysis approach users are guided by the dialogue controller in a robust manner to analyze the technical state of the industrial system. Root cause analysis is facilitated and improved in that the success of the analysis depends less on the skills or experience of the operator because the system provides the relevant knowledge and decision options to the operator at each relevant step of the dialogue.

Figure 10:
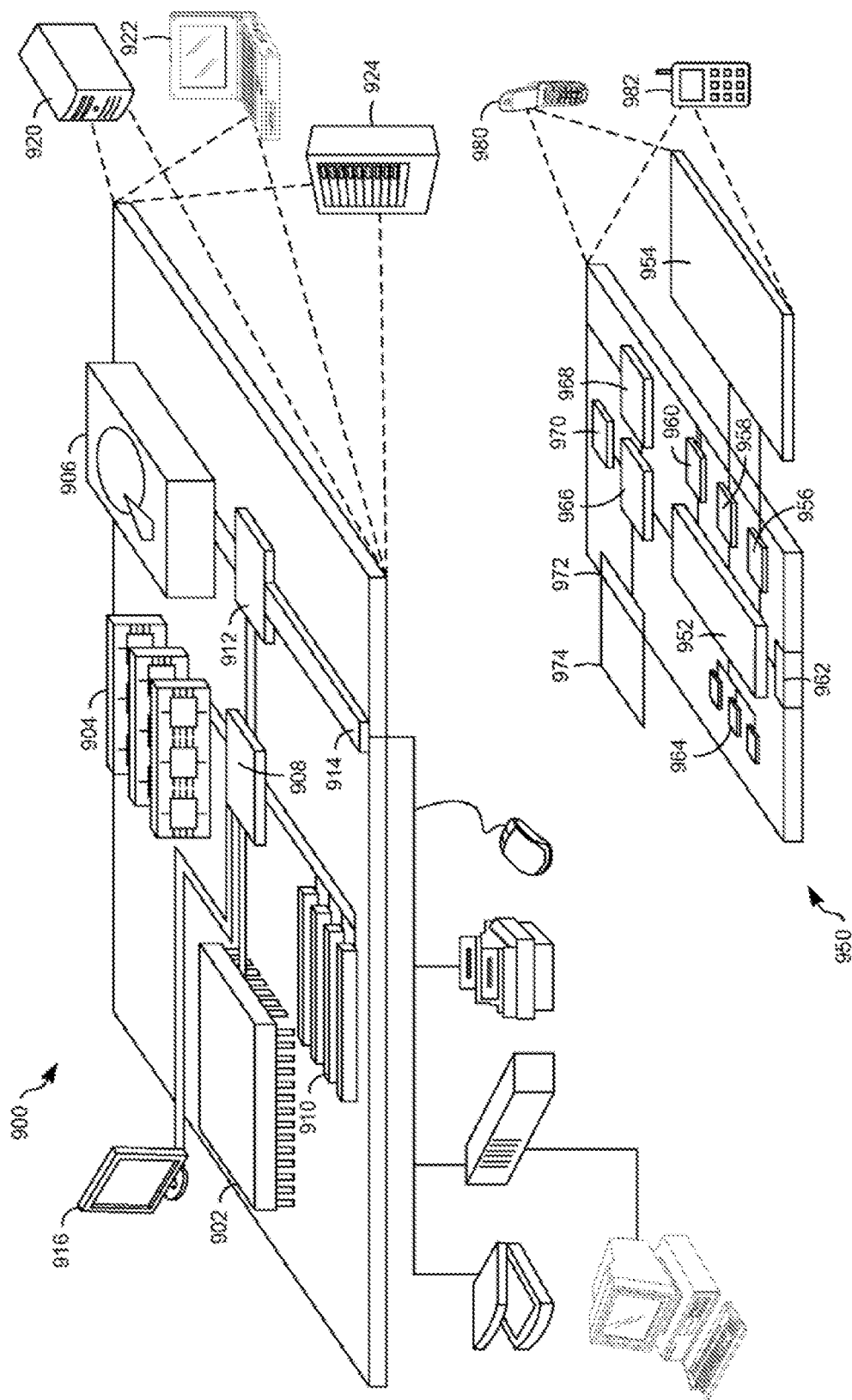
FIG. 10 is a diagram that shows an example of a generic computer device and a generic mobile computer device, which may be used with the techniques described herein.

FIG. 10 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to a computer system 100 as illustrated in FIG. 1. Computing device 950 is intended to represent various forms of mobile devices, such as personal digital assistants, cellular telephones, smart phones, and other similar computing devices. For example, computing device 950 may be used by an operator/user to submit intent inputs to the computer system 100 and to receive the rendered dialogue components based on the rendering information provided by the dialogue controller. The components shown here, their connections and relationships, and their functions, are meant to be exemplary only, and are not meant to limit implementations of the inventions described in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only.

In one implementation, the high-speed controller 908 is coupled to memory 904, display 916 (e.g., through a graphics processor or accelerator), and to high-speed expansion ports 910, which may accept various expansion cards. In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device, such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, EDGE, UMTS, LTE, among others. Such communication may occur, for example, through radio-frequency transceiver 968. In addition, short-range communication may occur, such as using a Bluetooth, WiFi, or other such transceiver. In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a backend component (e.g., as a data server), or that includes a middleware component (e.g., an application server), or that includes a front end component (e.g., a client computer having a graphical user interface or a Web browser through which a user can interact with an implementation of the systems and techniques described here), or any combination of such backend, middleware, or frontend components. The components of the system can be interconnected by any form or medium of digital data communication (e.g., a communication network). Examples of communication networks include a wireless communication network (e.g., 4G, 5G, etc.), a local area network ("LAN"), a wireless local area network ("WLAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the present disclosure.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer system for controlling a dialogue between a user and the computer system, the computer system being communicatively coupled with an industrial control system controlling an industrial system, the computer system comprising:
    an interface configured to receive intent inputs representing a respective desired interaction with the computer system;
    an intent determination module configured to determine the desired interactions of received intent inputs;
    a data storage configured to store one or more directed graphs, each graph specifying an industrial control domain specific dialogue, a particular graph defining a dialogue state machine with a plurality of nodes representing states of the dialogue, and with edges representing transitions between the states, each state transition from a first state to a second state depending on at least one precondition, the desired interaction of a received intent input corresponding to a target node to be reached from a current node of the particular graph;
    a context cache configured to store parameter values for parameters of the at least one precondition; and
    a dialogue controller module configured to:
        check if all parameter values required by the at least one precondition for transitioning from the current node to the target node are available in the received intent input or in the context cache,
        if at least one required parameter value is missing, then generate a temporary dialogue node to request the at least one missing parameter and store the requested parameter in the context cache upon receipt,
        else trigger an interaction associated with the target node to retrieve data about a technical state of the industrial control system as a response to the desired interaction associated with the target node,
    wherein the interface is configured to provide dialogue rendering information for presenting to the user cognitive information associated with the nodes which are processed by the dialogue controller module.

2. The computer system of claim 1, wherein the interface is configured to continuously listen to a user intent channel and to a monitoring intent channel, the user intent channel providing natural language intents from the user and the monitoring intent channel providing machine generated intents from a monitoring system for the industrial control system.

3. The computer system of claim 2, further comprising a session manager module configured to manage a separate dialogue session for each user,
wherein the separate dialogue session uses a dialogue graph which is associated with one or more roles of the respective user.

4. The computer system of claim 3, wherein a first role of the user is associated with a first dialogue graph and a second role of the user is associated with a second dialogue graph,
wherein the dialogue controller module is configured to enable transitions between the nodes of the first graph and nodes of the second graph.

5. The computer system of claim 1, wherein the particular dialogue graph includes at least one node which is directly reachable from all other nodes of the dialogue graph by respective transitions.

6. The computer system of claim 1, wherein a particular node represents the first state and the second state, and the state transition occurs as a self-loop for the particular node.

7. The computer system of claim 1, wherein the particular node is configured to reach itself via a circular path passing one or more other nodes of the graph.

8. The computer system of claim 1, further comprising a pre-fetch module configured to:
check if multiple nodes of the graph are reachable from the target node;
identify potential desired interactions associated with the multiple nodes;
retrieve technical state data of the industrial control system related to the identified desired interactions; and
assemble the retrieved state data together with the dialogue rendering information for the target node as a recommendation to the user for exploring the technical state of the industrial control system.

9. The computer system of claim 1, wherein the graph includes alternative dialogue paths for a particular desired interaction, each alternative path associated with a predefined performance level of the user,
wherein the computer system further comprises a performance evaluator module configured to:
receive one or more physical parameters characterizing the current condition of the user;
determine a current performance level for the user based on the physical parameters; and
select a particular alternative path having a predefined performance level which matches with the current performance level.

10. A computer-implemented method for controlling a dialogue between a user and the computer system, the computer system being communicatively coupled with an industrial control system controlling an industrial system, the method comprising:
receiving an intent input representing a respective desired interaction with the computer system;
determining the desired interaction of the received intent input;
matching the desired interaction with a target node to be reached from a current node of a directed graph specifying an industrial control domain specific dialogue, the graph defining a dialogue state machine with a plurality of nodes representing states of the dialogue, and with edges representing transitions between the states, each state transition from a first state to a second state depending on at least one precondition;
checking if all parameter values required by the at least one precondition for transitioning from the current node to the target node are available in the received intent input or in a context cache;
if at least one required parameter value is missing, generating a temporary dialogue node to request the at least one missing parameter and storing the requested parameter in the context cache upon receipt,
else triggering an interaction associated with the target node to retrieve data about the technical state of the industrial system as a response to the desired interaction associated with the target node; and
providing dialogue rendering information for presenting to the user cognitive information associated with the most recent processed node.

11. The method of claim 10, wherein receiving an intent input comprises continuously listening to a user intent channel and to a monitoring intent channel, the user intent channel providing natural language intents from the user and the monitoring intent channel providing machine generated intents from a monitoring system for the industrial system.

12. The method of claim 10, further comprising:
checking if multiple nodes of the graph are reachable from the target node;
identifying potential desired interactions associated with the multiple nodes;
retrieving technical state data related to the identified desired interactions if available; and
assembling the retrieved state data together with the dialogue rendering information for the target node as a recommendation to the user for exploring the technical state of the industrial system.

13. The method of claim 10, wherein the graph includes alternative dialogue paths for a particular desired interaction, each alternative path associated with a predefined performance level of the user,
wherein the method further comprises:
receiving one or more physical parameters characterizing the current condition of the user;
determining a current performance level for the user based on the physical parameters; and
selecting a particular alternative path having a predefined performance level which matches with the current performance level.

14. The method of claim 10, wherein a predefined data graph represents relations between data types of data related to the industrial system, each node of the data graph corresponding to a particular data type, each edge of the data graph having a precondition specifying an allowed query parameter for a particular query to retrieve respective data about the technical state of the industrial system, and a post condition specifying a return data type of the particular query,
wherein the method further comprises:
identifying a first data type associated with the target node of the dialogue graph;
identifying a first node in the data graph representing the first data type;
traversing the data graph to identify further data types having a direct or indirect relation with the first data type; and
assembling the identified further data types together with the dialogue rendering information for the target node as a recommendation to the user for potential queries to retrieve respective data about the technical state of the industrial system.

15. A computer program product for controlling a dialogue between a user and a computer system, the computer system being communicatively coupled with an industrial control system controlling an industrial system, the computer program product comprising instructions that when loaded into a memory of a computing device and executed by at least one processor of the computing device are configured cause the computing device to execute the steps of the computer-implemented method according to claim 10.

* * * * *